United States Patent
Sankai

(10) Patent No.: US 9,168,195 B2
(45) Date of Patent: Oct. 27, 2015

(54) MOTION-ASSIST SYSTEM OF WEARABLE MOTION-ASSIST DEVICE, WEARABLE MOTION-ASSIST DEVICE, AND MOTION-ASSIST METHOD OF WEARABLE MOTION-ASSIST DEVICE

(71) Applicant: UNIVERSITY OF TSUKUBA, Tsukuba-Shi, Ibaraki (JP)

(72) Inventor: Yoshiyuki Sankai, Tsukuba (JP)

(73) Assignee: UNIVERSITY OF TSUKUBA, Tsukuba-Shi, Ibaraki (JP)

( * ) Notice: Subject to any disclaimer, the term of this patent is extended or adjusted under 35 U.S.C. 154(b) by 0 days.

(21) Appl. No.: 14/183,099

(22) Filed: Feb. 18, 2014

(65) Prior Publication Data
US 2014/0163434 A1    Jun. 12, 2014

Related U.S. Application Data

(62) Division of application No. 12/596,788, filed as application No. PCT/JP2008/064700 on Aug. 18, 2008, now Pat. No. 8,690,802.

(30) Foreign Application Priority Data

Aug. 20, 2007  (JP) ................................. 2007-213359
Aug. 12, 2008  (JP) ................................. 2008-208027

(51) Int. Cl.
*A61H 1/00*    (2006.01)
*A61H 3/00*    (2006.01)
*A61H 1/02*    (2006.01)

(52) U.S. Cl.
CPC ................. *A61H 1/00* (2013.01); *A61H 1/0255* (2013.01); *A61H 3/00* (2013.01); *A61H 3/008* (2013.01);
(Continued)

(58) Field of Classification Search
CPC ........... A61H 3/00; A61H 3/008; A61H 1/00; A61H 1/0255; A61H 2201/5012; A61H 2201/5015; A61H 2201/5061; A61H 2201/5069; A61H 2201/1215; A61H 2201/163; A61H 2201/1642; A61H 2201/1676; A61H 2201/165; A61H 2230/08; A61H 2230/10; A61H 2230/605; A61H 2230/50
USPC ............ 601/5, 23, 33, 34, 35; 602/23, 24, 25, 602/26
See application file for complete search history.

(56) References Cited

U.S. PATENT DOCUMENTS

2006/0293617 A1* 12/2006 Einav et al. ..................... 601/33
2007/0225620 A1   9/2007 Carignan et al.
2012/0179075 A1* 7/2012 Perry et al. ..................... 601/33

FOREIGN PATENT DOCUMENTS

JP    2001-087247 A    4/2001
JP    2002-523182 A    7/2002
(Continued)

OTHER PUBLICATIONS

Extended European Search Report dated Aug. 29, 2011; Appln. No. 08827659.7-2316/2189136 PCT/JP2008064700.
(Continued)

*Primary Examiner* — Quang D Thanh
(74) *Attorney, Agent, or Firm* — Ladas & Parry LLP

(57) ABSTRACT

A motion state of a wearable motion-assist device of a doctor is sent to the wearable motion-assist device of a patient via a network. Then, this motion state is applied to the wearable motion-assist device of the patient, so that rehabilitation is conducted for the patient. Furthermore, the motion state of the wearable motion-assist device of the patient is sent from the wearable motion-assist device to the wearable motion-assist device. Then, the motion state of the wearable motion-assist device is applied to the wearable motion-assist device. Accordingly, the doctor can objectively sense the state of the patient.

8 Claims, 16 Drawing Sheets

(52) U.S. Cl.
CPC ... *A61H 2201/1215* (2013.01); *A61H 2201/163* (2013.01); *A61H 2201/165* (2013.01); *A61H 2201/1642* (2013.01); *A61H 2201/1676* (2013.01); *A61H 2201/5012* (2013.01); *A61H 2201/5015* (2013.01); *A61H 2201/5061* (2013.01); *A61H 2201/5069* (2013.01); *A61H 2230/08* (2013.01); *A61H 2230/10* (2013.01); *A61H 2230/50* (2013.01); *A61H 2230/605* (2013.01)

(56) References Cited

FOREIGN PATENT DOCUMENTS

| | | |
|---|---|---|
| JP | 2003-199799 A | 7/2003 |
| JP | 2003-230545 A | 8/2003 |
| JP | 2004-184351 A | 7/2004 |
| JP | 2005-095561 A | 4/2005 |
| JP | 2005-230099 A | 9/2005 |
| JP | 2005-253650 A | 9/2005 |
| JP | 2005-278706 A | 10/2005 |
| JP | 2006-204426 A | 8/2006 |
| JP | 2008-264509 A | 11/2008 |
| WO | 01/13778 A2 | 3/2001 |
| WO | 2005/087172 A1 | 9/2005 |
| WO | 2008/123040 A1 | 10/2008 |

OTHER PUBLICATIONS

International Search Report mailed Nov. 25, 2008; PCT/JP2008/064700.

USPTO RR dated Dec. 14, 2012 in connection with U.S. Appl. No. 12/596,788.

USPTO NFOA dated Apr. 8, 2013 in connection with U.S. Appl. No. 12/596,788.

USPTO NOA mailed Nov. 22, 2013 in connection with U.S. Appl. No. 12/596,788.

* cited by examiner

MOTION-ASSIST SYSTEM OF WEARABLE MOTION-ASSIST DEVICE, WEARABLE MOTION-ASSIST DEVICE, AND MOTION-ASSIST METHOD OF WEARABLE MOTION-ASSIST DEVICE

TECHNICAL FIELD

The present invention relates to a motion-assist system using a wearable motion-assist device, and more particularly, to a motion-assist system of a wearable motion-assist device, a wearable motion-assist device, and a motion-assist method of the wearable motion-assist device, with which a doctor can recognize the state of a patient via a network and appropriately conduct rehabilitation for the patient wearing the wearable motion-assist device, even when the doctor and the patient are at remote locations from one another.

BACKGROUND ART

In recent years, wearable motion-assist devices have been developed, separately from autonomous robots. A wearable motion-assist device is wearable by a human body for assisting human activity of the human body. The wearable motion-assist device assists the motion of the wearer. The assistance is implemented by acquiring bioelectrical signals (biological information including, for example; myoelectric potential signals, neurotransmission signals, and brain wave detection signals) of the wearer, and supplying power in accordance with the intention of the wearer, to an actuator of the wearable motion-assist device, based on the acquired bioelectrical signals (see patent documents 1 through 3).

Meanwhile, it is known that doctors and physical therapists conduct rehabilitation for patients who cannot move their bodies due to factors such as cerebral apoplexy and spinal cord injury, for the purpose of recovering muscle strength and preventing muscle strength from declining.

Typically, the doctor or physical therapist directly faces the patient and confirms the state of the patient while conducting the rehabilitation. However, even if the patient cannot come to the hospital because the patient cannot move his/her body, etc., rehabilitation can be conducted by bi-directionally communicating audio-visual signals between the patient and the doctor via a network.

Patent Document 1: Japanese Laid-Open Patent Application No. 2005-95561
Patent Document 2: Japanese Laid-Open Patent Application No. 2005-230099
Patent Document 3: Japanese Laid-Open Patent Application No. 2005-253650

However, in order to recognize the state of the patient, the conventional rehabilitation method is dependent on information conveyed from the patient to the doctor and findings of the doctor. Thus, the doctor cannot objectively know (recognize) the state of the patient. More specifically, the doctor cannot objectively recognize how much the patient is trying to move his/her body, or how much the patient's body is actually moving.

In order to effectively conduct the rehabilitation, the doctor needs to objectively recognize the state of the patient. However, with the conventional rehabilitation method, it has been difficult to effectively conduct the rehabilitation.

Accordingly, there is a need for a motion-assist system of a wearable motion-assist device, a wearable motion-assist device, and a motion-assist method of the wearable motion-assist device, with which the state of a target of motion assistance, such as a patient or a trainee, can be objectively recognized to effectively conduct motion assistance such as rehabilitation and training.

DISCLOSURE OF THE INVENTION

The present invention may solve one or more problems of the related art.

A preferred embodiment of the present invention may provide a motion-assist system of a wearable motion-assist device, the wearable motion-assist device including a biological signal detecting unit configured to detect a biological signal generated in accordance with a motion of a wearer of a motion-assist tool included in the wearable motion-assist device; a physical phenomenon detecting unit configured to detect a detection signal corresponding to a physical phenomenon in accordance with the motion of the wearer; a driving unit configured to apply assistance power to the motion-assist tool worn by the wearer; and a control unit configured to control the driving unit to generate the assistance power, by performing a calculation process based on the detection signal detected by the physical phenomenon detecting unit, the motion-assist system including a communications unit configured to connect together a plurality of the control units of a plurality of the wearable motion-assist devices such that communications can be performed therebetween; and a data transfer unit configured to transfer data corresponding to at least one of the signals acquired in one of the wearable motion-assist devices, to another one of the wearable motion-assist devices via the communications unit, wherein the control unit of the other one of the wearable motion-assist devices controls the driving unit based on the data transferred by the data transfer unit, such that a motion of the other one of the wearable motion-assist devices corresponds to a motion of the one of the wearable motion-assist devices.

A preferred embodiment of the present invention may provide a motion-assist system of wearable motion-assist devices, for performing communications between a first wearable motion-assist device of a first wearer and a second wearable motion-assist device of a second wearer to perform motion assistance for the second wearer, the first wearable motion-assist device including a first angle control output torque calculating unit configured to receive a second joint angle of the second wearable motion-assist device sent from the second wearable motion-assist device, and to calculate a first angle control output torque for the second wearable motion-assist device, based on the received second joint angle and a first joint angle of the first wearable motion-assist device corresponding to the received second joint angle; a first force control output torque calculating unit configured to receive an output torque of the second wearable motion-assist device sent from the second wearable motion-assist device, and to calculate a first force control output torque for the second wearable motion-assist device based on the received output torque; a first assist control output torque calculating unit configured to calculate a first assist control output torque based on an output torque of an actuator unit of the first wearable motion-assist device, the first joint angle of the first wearable motion-assist device, a first bioelectrical signal corresponding to a muscle force generated by the first wearer, and a first relative force applied to a frame of the first wearable motion-assist device; a first output torque calculating unit configured to calculate a first output torque for the second wearable motion-assist device, based on at least one of the calculated first angle control output torque and the calculated first force control output torque, and the calculated first assist control output torque; and a first sending unit configured to send the calculated first output torque and the first joint angle of the first wearable motion-assist device to the second wearable motion-assist device, the second wearable motion-assist device including a second angle control output torque calculating unit configured to receive the first joint angle of the first wearable motion-assist device sent from the first wearable motion-assist device, and to calculate a second angle control output torque for the first wearable motion-assist device, based on the received first joint angle and the second joint angle of the second wearable motion-assist device corresponding to the received first joint angle; a second force control output torque calculating unit configured to receive the first output torque sent from the first wearable motion-assist device, and to calculate a second force control output torque for the second wearable motion-assist device based on the received first output torque; a second assist control output torque calculating unit configured to calculate a second assist control output torque based on an output torque of an actuator unit of the second wearable motion-assist device, the second joint angle of the second wearable motion-assist device, a second bioelectrical signal corresponding to a muscle force generated by the second wearer, and a second relative force applied to a frame of the second wearable motion-assist device; a second output torque calculating unit configured to calculate a second output torque for the first wearable motion-assist device, based on at least one of the calculated second angle control output torque and the calculated second force control output torque, and the calculated second assist control output torque; and a second control unit configured to control the actuator unit of the second wearable motion-assist device in accordance with the calculated second output torque.

A preferred embodiment of the present invention may provide a wearable motion-assist device worn by a wearer for performing communications with another wearable motion-assist device worn by another wearer, to instruct the other wearable motion-assist device to perform motion assistance or to perform motion assistance based on instructions from the other wearable motion-assist device, the wearable motion-assist device including an angle control output torque calculating unit configured to receive a joint angle of the other wearer of the other wearable motion-assist device sent from the other wearable motion-assist device, and to calculate an angle control output torque for the other wearable motion-assist device, based on the received joint angle of the other wearer and a joint angle corresponding to the received joint angle of the other wearer of the other wearable motion-assist device; a force control output torque calculating unit configured to receive an output torque of the other wearable motion-assist device sent from the other wearable motion-assist device, and to calculate a force control output torque for the other wearable motion-assist device based on the received output torque; an assist control output torque calculating unit configured to calculate an assist control output torque based on an output torque of an actuator unit of the wearable motion-assist device, the joint angle of the wearable motion-assist device, a bioelectrical signal corresponding to a muscle force generated by the wearer, and a relative force applied to a frame of the wearable motion-assist device; an output torque calculating unit configured to calculate an output torque for the other wearable motion-assist device of the other wearer, based on at least one of the calculated angle control output torque and the calculated force control output torque, and the calculated assist control output torque; and a control unit configured to control the actuator unit of the wearable motion-assist device in accordance with the calculated output torque.

A preferred embodiment of the present invention may provide a motion-assist method of a wearable motion-assist device, for performing communications between a first wearable motion-assist device worn by a first wearer and a second wearable motion-assist device worn by a second wearer to perform motion assistance for the second wearer, the motion-assist method including the steps performed by the first wearable motion-assist device of receiving a second joint angle of the second wearable motion-assist device sent from the second wearable motion-assist device, and calculating a first angle control output torque for the second wearable motion-assist device, based on the received second joint angle and a first joint angle of the first wearable motion-assist device corresponding to the received second joint angle; receiving an output torque of the second wearable motion-assist device sent from the second wearable motion-assist device, and calculating a first force control output torque for the second wearable motion-assist device based on the received output torque; calculating a first assist control output torque based on an output torque of an actuator unit of the first wearable motion-assist device, the first joint angle of the first wearable motion-assist device, a first bioelectrical signal corresponding to a muscle force generated by the first wearer, and a first relative force applied to a frame of the first wearable motion-assist device; calculating a first output torque for the second wearable motion-assist device, based on at least one of the calculated first angle control output torque and the calculated first force control output torque, and the calculated first assist control output torque; and sending the calculated first output torque and the first joint angle of the first wearable motion-assist device to the second wearable motion-assist device, the motion-assist method further including the steps performed by the second wearable motion-assist device of receiving the first joint angle of the first wearable motion-assist device sent from the first wearable motion-assist device, and calculating a second angle control output torque for the first wearable motion-assist device, based on the received first joint angle and the second joint angle of the second wearable motion-assist device corresponding to the received first joint angle; receiving the first output torque sent from the first wearable motion-assist device, and calculating a second force control output torque for the second wearable motion-assist device based on the received first output torque; calculating a second assist control output torque based on an output torque of an actuator unit of the second wearable motion-assist device, the second joint angle of the second wearable motion-assist device, a second bioelectrical signal corresponding to a muscle force generated by the second wearer, and a second relative force applied to a frame of the second wearable motion-assist device; calculating a second output torque for the first wearable motion-assist device, based on at least one of the calculated second angle control output torque and the calculated second force control output torque, and the calculated second assist control output torque; and controlling the actuator unit of the second wearable motion-assist device in accordance with the calculated second output torque.

A preferred embodiment of the present invention may provide a motion-assist method of a wearable motion-assist device, for performing communications with another wearable motion-assist device worn by another wearer, to instruct the other wearable motion-assist device to perform motion assistance or to perform motion assistance based on instructions from the other wearable motion-assist device, the wearable motion-assist device including the steps of receiving a joint angle of the other wearer of the other wearable motion-assist device sent from the other wearable motion-assist device, and calculating an angle control output torque for the other wearable motion-assist device, based on the received joint angle of the other wearer and a joint angle corresponding to the received joint angle of the other wearer of the other wearable motion-assist device; receiving an output torque of the other wearable motion-assist device sent from the other wearable motion-assist device, and calculating a force control output torque for the other wearable motion-assist device based on the received output torque; calculating an assist control output torque based on an output torque of an actuator unit of the wearable motion-assist device, the joint angle of the wearable motion-assist device, a bioelectrical signal corresponding to a muscle force generated by the wearer, and a relative force applied to a frame of the wearable motion-assist device; calculating an output torque for the other wearable motion-assist device, based on at least one of the calculated angle control output torque and the calculated force control output torque, and the calculated assist control output torque; and controlling the actuator unit of the wearable motion-assist device in accordance with the calculated output torque.

Figure 1:
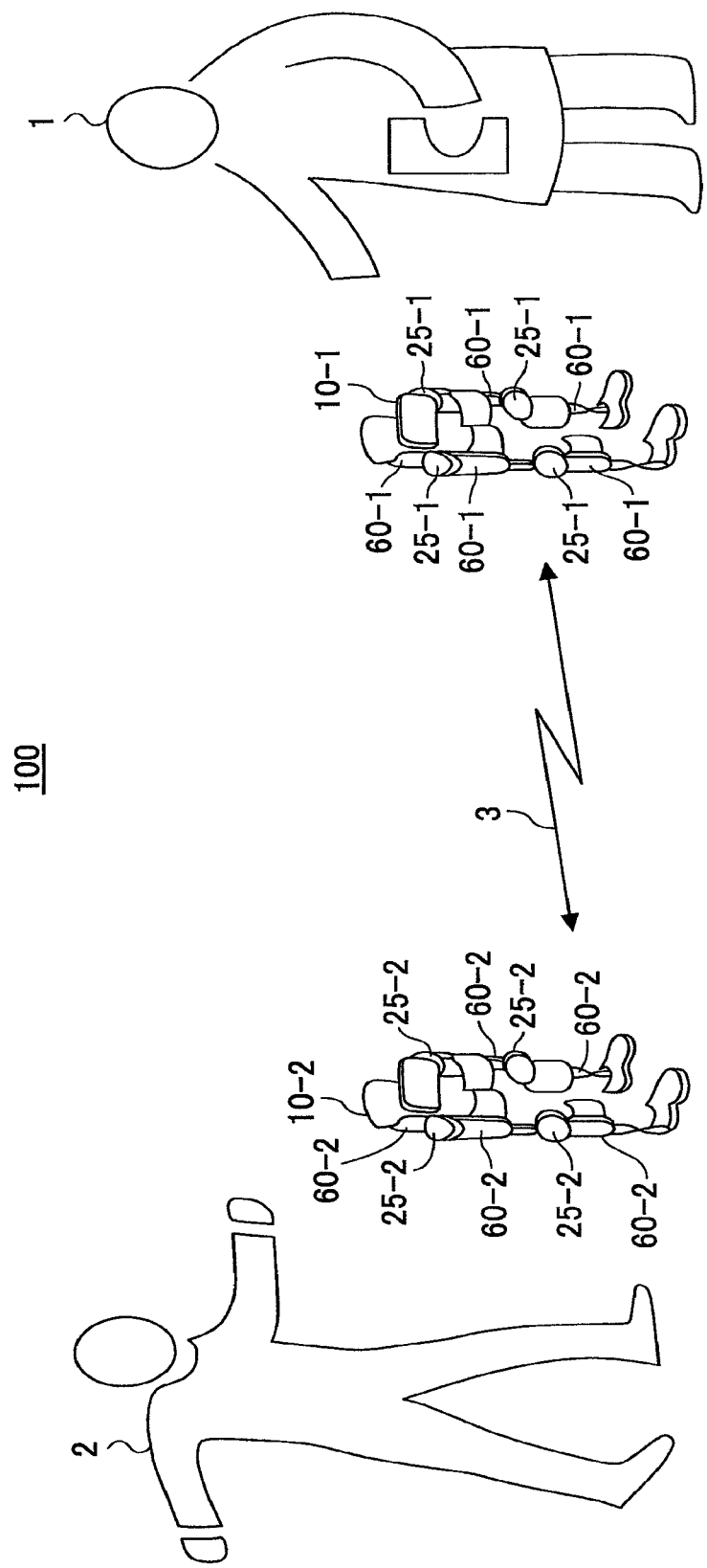
FIG. 1 schematically illustrates a usage environment of a motion-assist system of a wearable motion-assist device according to an embodiment of the present invention.

EXPLANATION OF REFERENCES 10-1, 10-2 wearable motion-assist device
20-1, 20-2 suit mechanism unit
21-1, 21-2 biological information measuring unit
22-1, 22-2 relative force detecting unit
23-1, 23-2 bioelectrical signal detecting unit
24-1, 24-2 angle detecting unit
25-1, 25-2 actuator unit
26-1, 26-2 control device
27-1, 27-2 driver
28-1, 28-2 communications device
29-1, 29-2 body temperature measuring unit
41 data storing unit
42 angle controlling unit
43 force controlling unit
44 assist controlling unit
45 mode setting unit
46 output torque adding unit
47 torque output unit
48 data sending unit
118 frame mechanism
120, 122, 124, 126 motor
138a, 138b, 140a, 140b, 142a, 142b, 144a, 144b biological signal detecting sensor
130 waist fastening member
154 right leg assisting unit
155 left leg assisting unit
158 first frame
160 second frame
162 third frame
164 first joint
166 second joint
168 third joint
178 thigh fastening member
180 shin fastening member
179, 181 fitting part
301 through 304 temperature sensor
311 through 314 temperature adjusting elements

BEST MODE FOR CARRYING OUT THE INVENTION

A description is given, with reference to the accompanying drawings, of a motion-assist system using a wearable motion-assist device according to an embodiment of the present invention. In the present embodiment, a doctor and a patient are described as targets of the motion-assist system, to which the present invention is not limited. For example, a trainer and a trainee may be the targets. As a matter of course, the present invention is applicable to anyone who is in need of motion assistance.

FIG. 1 schematically illustrates a usage environment of a motion-assist system of a wearable motion-assist device according to the present embodiment.

As shown in FIG. 1, a wearable motion-assist device 10-1 (a wearable motion-assist device) of a doctor 1 (first wearer) and a wearable motion-assist device 10-2 (another wearable motion-assist device) of a patient 2 (second wearer) are connected via a network 3. If the doctor 1 and the patient 2 are relatively close to each other, the network 3 may be a wireless network, for example, Bluetooth or a public wireless LAN such as IEEE802.11a/11b. When the doctor 1 and the patient 2 are at different locations, the network 3 may be a wired network such as a public telephone line or the Internet.

Even when the wearable motion-assist devices 10-1 and 10-2 are located remotely from each another, communications can be performed between them via a wired network or the Internet.

The wearable motion-assist device 10-1 of the doctor 1 and the wearable motion-assist device 10-2 of the patient 2 are configured such that frames 60-1 and 60-2, extending along joints including the hip, thighs, and shins of the body of the human being (wearer), are rotatably connected to actuator units 25-1 and 25-2, respectively. The wearable motion-assist devices 10-1 and 10-2 shown in FIG. 1 are used for the lower body, with the actuator units 25-1 and 25-2 provided at portions corresponding to knee joints and hip joints. However, the wearable motion-assist device of the motion-assist system according to the present invention is not so limited. A wearable motion-assist device for the upper body or the whole body may be applied.

Information on physical phenomena at the actuator units 25-1 and 25-2 (for example, joint angles and output torque) is communicated between the wearable motion-assist device 10-1 of the doctor 1 and the wearable motion-assist device 10-2 of the patient 2 via the network 3.

The following are typical embodiments of the present invention.

First embodiment (patient→doctor, patient←doctor, bidirectional communication): The rehabilitation is conducted with the doctor 1 wearing the wearable motion-assist device 10-1 and the patient 2 wearing the wearable motion-assist device 10-2 (hereinafter, "first embodiment").

Second embodiment (patient→doctor): The doctor 1 examines the patient 2 as data (joint angles, torque, monitoring information, etc.) is sent from the wearable motion-assist device 10-2 worn by the patient 2 to the wearable motion-assist device 10-1 of the doctor 1, so that the data is applied to or displayed on the wearable motion-assist device 10-1 (hereinafter, "second embodiment").

In the second embodiment, the wearable motion-assist device 10-1 of the doctor 1 does not send data to the wearable motion-assist device 10-2.

Third embodiment (patient←doctor): The doctor 1 conducts rehabilitation for the patient 2 by moving the wearable motion-assist device 10-1 worn by the doctor 1, so that data (joint angles, torque), which is sent from the wearable motion-assist device 10-1, is supplied to and applied to the wearable motion-assist device 10-2 (hereinafter, "third embodiment").

In the third embodiment, monitoring information is sent from the wearable motion-assist device 10-2 of the patient 2 to the wearable motion-assist device 10-1 of the doctor 1, but other information is not sent to the wearable motion-assist device 10-1.

The following are descriptions of the embodiments.

First Embodiment

A description is given of a motion-assist system 100 according to the present embodiment, in which the rehabilitation is conducted with the doctor 1 wearing the wearable motion-assist device 10-1 and the patient 2 wearing the wearable motion-assist device 10-2.

In the motion-assist system 100, the wearable motion-assist device 10-1 acting as the master and the wearable motion-assist device 10-2 acting as the slave are configured to interact with each other by bidirectional communication performed via the network 3.

The wearable motion-assist device 10-1 worn by the doctor 1 includes a communications unit for sending detection signals (detection data) of physical phenomena such as joint angles and output torque values of the wearable motion-assist device 10-1. The detection data output from the wearable motion-assist device 10-1 is sent to the wearable motion-assist device 10-2 via the communications unit and the network 3.

The wearable motion-assist device 10-2 of the patient receives the detection signals (detection data) of physical phenomena such as joint angles and output torque values of the wearable motion-assist device 10-1, which are sent from the wearable motion-assist device 10-1 according to rehabilitation motions of the doctor 1. The received joint angles and output torque values of the wearable motion-assist device 10-1 are applied to the wearable motion-assist device 10-2 itself (of the patient 2), based on the joint angles and output torque values of the wearable motion-assist device 10-2 itself.

When the wearable motion-assist device 10-2 of the patient moves, the wearable motion-assist device 10-1 of the doctor receives the detection signals (detection data) of physical phenomena such as joint angles and output torque values of the wearable motion-assist device 10-2 which are sent from the wearable motion-assist device 10-2. Then, the received joint angles and output torque values of the wearable motion-assist device 10-2 are applied to the wearable motion-assist device 10-1 itself (of the doctor 1), based on the joint angles and output torque values of the wearable motion-assist device 10-1 itself.

The motion-assist system 100 including the wearable motion-assist devices 10-1 and 10-2 performs such communication in a real-time manner. Accordingly, when the doctor 1 moves the wearable motion-assist device 10-1 to conduct rehabilitation, the motion is immediately applied to the wearable motion-assist device 10-2 worn by the patient 2, so that the rehabilitation is implemented.

Furthermore, the state of the wearable motion-assist device 10-2 (=the state of the patient 2) is applied to the wearable motion-assist device 10-1. As a result, the doctor 1 can physically perceive the state of the wearable motion-assist device 10-1. Accordingly, the doctor 1 can precisely recognize, in a real-time manner, the state of the patient 2 with the wearable motion-assist device 10-1. The doctor 1 further moves the wearable motion-assist device 10-1 with reference to the state of the patient 2 in a real-time manner thus recognized, so that the rehabilitation is conducted more effectively.

Figure 2:
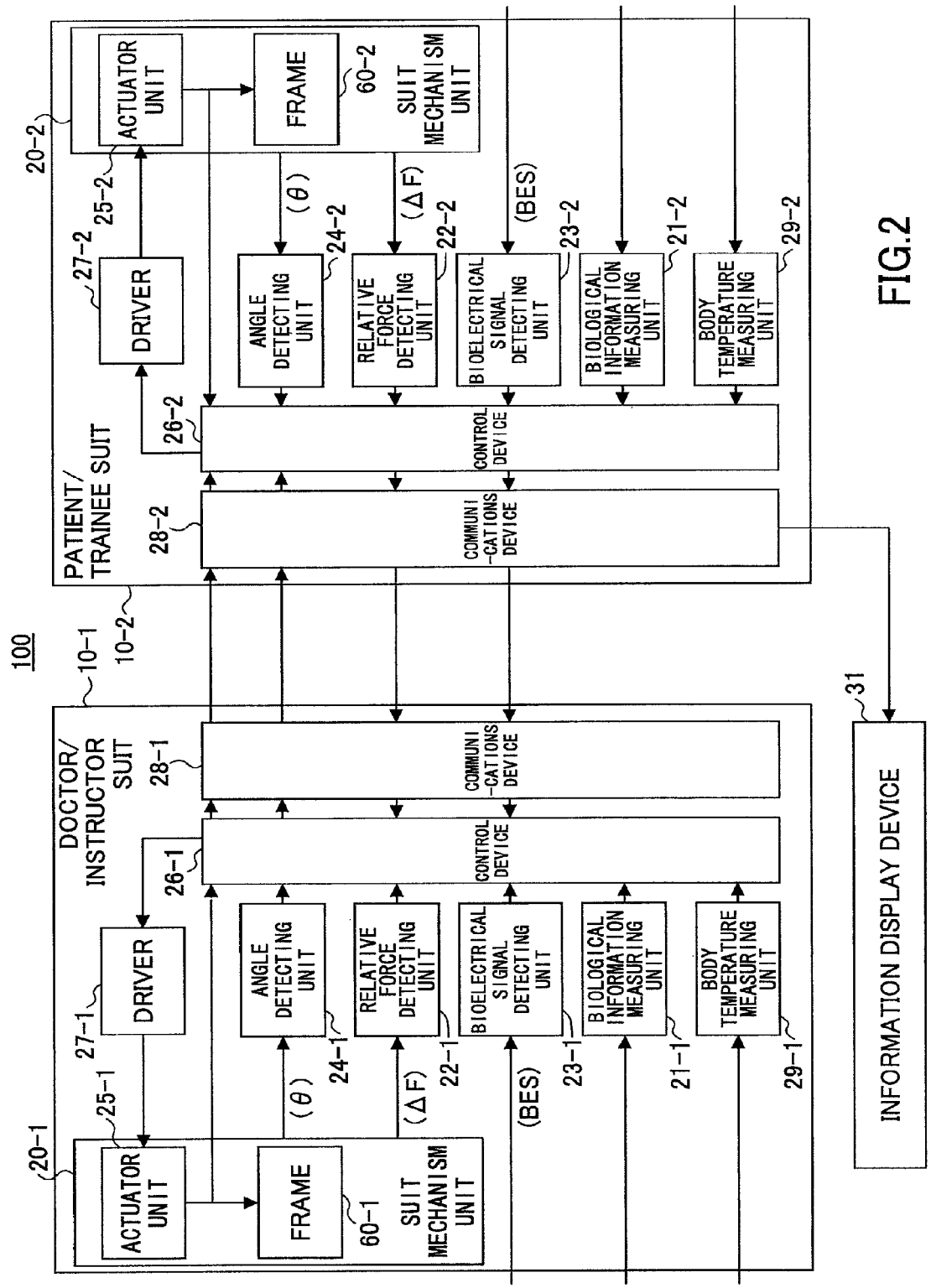
FIG. 2 is a block diagram of a control system of the wearable motion-assist device.

FIG. 2 is a block diagram of a control system of the wearable motion-assist device. As shown in FIG. 2, the wearable motion-assist device 10-1 includes a suit mechanism unit 20-1 (motion-assist tool), a biological information measuring unit 21-1, a relative force detecting unit 22-1, a bioelectrical signal detecting unit 23-1, an angle detecting unit 24-1, an actuator unit 25-1, a control device 26-1, a driver 27-1, a communications device 28-1, and a body temperature measuring unit 29-1.

The suit mechanism unit 20-1 is the mechanism part of a robot-type suit worn by the doctor 1, which includes frames 60-1 which are rotatably connected to the actuator units 25-1. A configuration example of the suit mechanism unit 20-1 is described below with reference to FIGS. 3 through 5.

The biological information measuring unit 21-1 is for measuring biological information such as the cardiac potential and the body temperature of the wearer wearing the wearable motion-assist device 10-1, and outputting the biological information to the control device 26-1.

The relative force detecting unit 22-1 is, for example, a force sensor, for detecting the force that is applied to the frame of the suit mechanism unit 20-1, i.e., the relative force that is defined by the relationship between the output torque of the actuator unit 25-1 which is the driving source and the muscle strength of the doctor who is the wearer.

The relative force is the force applied to the frame of the suit mechanism unit 20-1, which indicates the force received by the wearer (doctor 1) by the output torque of the actuator unit 25-1, i.e., the extent of assistance received by the wearer. For example, depending on the extent of the actual muscle torque that can be generated by the wearer, even if the same level of torque is received from the actuator unit 25-1, the force received by the wearer (extent of assistance force) may vary according to the load defined by the build (weight) and the flexibility of joints of the wearer as well as external forces (for example, assistance forces given by a care person). Accordingly, measuring the actual force applied to the frame of the suit mechanism unit 20-1 means measuring the actual force received by the wearer from the frame. That is, the relative force is the force applied to the frame, i.e., the force (assistance force) received by the wearer via the frame.

The force sensor is for measuring the force applied to the frame of the suit mechanism unit 20-1. For example, the force sensor includes a strain gauge for detecting the strain caused by the applied force, and outputs electric signals proportional to strain. The force sensor is disposed at a portion of the frame of the suit mechanism unit 20-1 that bends due to the driving torque from the actuator unit 25-1.

The bioelectrical signal detecting unit 23-1 is for detecting bioelectrical signals (for example, myoelectric potential signals, neurotransmission signals, and brain wave signals) which are generated when the wearer wearing the wearable motion-assist device 10-1 moves muscles around his/her joints. For example, in the present embodiment, a myoelectric potential sensor is used. Furthermore, in the present embodiment, the myoelectric potential sensor is attached so as to adhere to the skin surface around a joint of the wearer with an adhesive sticker covering the periphery of the electrode.

In the present embodiment, signals detected by the myoelectric potential sensor adhering to the skin surface around a joint of the wearer (around a muscle used for moving the joint), are referred to as myoelectric potential signals.

The angle detecting unit 24-1 is a physical phenomenon detecting unit for detecting the rotational angle of the knee joint of the wearer (one of the physical phenomena). For example, an angle sensor is used as the angle detecting unit 24-1. The angle sensor is, for example, a rotary encoder for counting the number of pulses proportional to the joint angle of the suit mechanism unit 20-1, and outputting, as the sensor output, electric signals in accordance with the number of pulses corresponding to the joint angle. Specifically, the angle sensor detects the rotational angle between two frames connected to the actuator unit 25-1 of the suit mechanism unit 20-1.

The control device 26-1 is for calculating an output torque value based on the joint angle and output torque of the wearable motion-assist device 10-1 (of the doctor 1), the joint angle and output torque of the wearable motion-assist device 10-2 sent from the wearable motion-assist device 10-2 of the patient 2, and the bioelectrical signals and the relative force of the wearable motion-assist device 10-1. The calculated output torque value indicates the value of the torque to be output from the actuator unit 25-1.

Then, a signal corresponding to the calculated output torque value is supplied to the driver 27-1. Furthermore, the calculated output torque value is sent to the wearable motion-assist device 10-2, together with the joint angle of the wearable motion-assist device 10-1 that has been measured.

The driver 27-1 is for supplying power to the actuator unit 25-1, so that the actuator unit 25-1 outputs torque corresponding to the output torque value output from the control device 26-1. In the present embodiment, the driver 27-1 supplies a driving current corresponding to the output torque value to the motor of the actuator unit 25-1.

The actuator unit 25-1 is for applying, to the frame 60-1 that is rotatably connected to the actuator unit 25-1, output torque based on the driving current supplied from the driver 27-1, as the assistance force. The assistance force, which may also be referred to as the assistance torque, is the force applied by using the actuator unit 25-1 as a rotational axis. The actuator unit 25-1 is disposed at a location corresponding to a joint of the wearer in the suit mechanism unit 20-1. Furthermore, the assistance torque applied with the actuator unit 25-1 is fed back to the control device 26-1. In the present embodiment, the actuator unit 25-1 includes an electric motor acting as a driving source and a gear mechanism for reducing the rotational speed of the motor and transmitting the rotational driving force of the motor.

The communications device 28-1 is a communications unit including communications equipment such as a communication modem and a router connected to a public line or the Internet, for sending various data items obtained by the wearable motion-assist device 10-1 to the wearable motion-assist device 10-2.

The body temperature measuring unit 29-1 is, for example, a temperature sensor for measuring the body temperature of thighs and shins, etc., produced by the motion of the doctor 1. An example is a thermistor that outputs body temperature detection signals indicating the body temperature.

The motion-assist system according to the present embodiment includes an information display device 31 provided separately from the wearable motion-assist device 10-1. The information display device 31 receives information such as joint angles, muscle torque, motor torque, bioelectrical signals (for example, myoelectric potential signals, neurotransmission signals, cardiac potential signals, and brain wave signals), and body temperature; converts the information into graphs, diagrams, and values; and displays the conversion results. The information is not limited to being converted into a visual format such as a graph; the information may be converted into sound which is sent to the doctor 1. Furthermore, the information display device 31 may be combined with the wearable motion-assist device as a single unit.

The wearable motion-assist device 10-2 worn by the patient 2 has the same configuration as the wearable motion-assist device 10-1, and includes a suit mechanism unit 20-2 (motion-assist tool), a biological information measuring unit 21-2, a relative force detecting unit 22-2, a bioelectrical signal detecting unit 23-2, an angle detecting unit 24-2, an actuator unit 25-2, a control device 26-2, a driver 27-2, a communications device 28-2, and a body temperature measuring unit 29-2.

The suit mechanism unit 20-2 is the mechanism part of a robot-type suit worn by the patient 2, and has the same configuration as that of the above-described suit mechanism unit 20-1. A configuration example of the suit mechanism unit 20-2 is described below with reference to FIGS. 3 through 5. The suit mechanism unit 20-2 is to be worn by a human being.

The biological information measuring unit 21-2 is for measuring biological information such as the cardiac potential and the body temperature of the wearer wearing the wearable motion-assist device 10-2, and outputting the biological information to the control device 26-2.

The relative force detecting unit 22-2 is, for example, a force sensor, for detecting the force that is applied to the frame of the suit mechanism unit 20-2, i.e., the relative force that is defined by the relationship between the output torque of the actuator unit 25-2 which is the driving source and the muscle strength of the patient who is the wearer. The relative force is the sum of the output torque of the actuator unit 25-2 and the muscle force of the patient who is the wearer, which corresponds to the total force applied to the frame of the suit mechanism unit 20-2.

The force sensor is for measuring the force applied to the frame of the suit mechanism unit 20-2. For example, the force sensor includes a strain gauge for detecting the strain caused by the applied force, and output electric signals proportional to strain. The force sensor is disposed at a portion of the frame of the suit mechanism unit 20-2 that bends due to the driving torque from the actuator unit 25-2.

The bioelectrical signal detecting unit 23-2 is for detecting bioelectrical signals (for example, myoelectric potential signals, neurotransmission signals, and brain wave signals) which are generated when the wearer wearing the wearable motion-assist device 10-2 moves muscles around his/her joints. For example, in the present embodiment, a myoelectric potential sensor is used. Furthermore, in the present embodiment, the myoelectric potential sensor is attached so as to adhere to the skin surface around a joint of the wearer with an adhesive sticker covering the periphery of the electrode.

The angle detecting unit 24-2 is, for example, an angle sensor. The angle sensor is, for example, a rotary encoder for counting the number of pulses proportional to the joint angle of the suit mechanism unit 20-2, and outputting, as the sensor output, electric signals in accordance with the number of pulses corresponding to the joint angle. Specifically, the angle sensor detects the rotational angle between two frames connected to the actuator unit 25-2 of the suit mechanism unit 20-2.

The control device 26-2 is for calculating an output torque value based on the joint angle and output torque of the wearable motion-assist device 10-2 of itself, the joint angle and output torque of the wearable motion-assist device 10-1 sent from the wearable motion-assist device 10-1 of the doctor 1, and the bioelectrical signals and the relative force of the wearable motion-assist device 10-2. The calculated output torque value indicates the value of the torque to be output from the actuator unit 25-2.

Then, a signal corresponding to the calculated output torque value is supplied to the driver 27-2. Furthermore, the calculated output torque value is sent to the wearable motion-assist device 10-1, together with the joint angle of the wearable motion-assist device 10-2 that has been measured.

Furthermore, the control device 26-2 sends monitoring information to the information display device 31, such as joint angles of the wearable motion-assist device 10-2, the motor torque, the muscle torque of the patient 2, bioelectrical signals (bioelectrical potential), the cardiac potential, and body temperature.

The driver 27-2 is for supplying power to the actuator unit 25-2, so that the actuator unit 25-2 outputs torque corresponding to the output torque value output from the control device 26-2. In the present embodiment, the driver 27-2 supplies a driving current corresponding to the output torque value to the motor of the actuator unit 25-2.

The actuator unit 25-2 is for applying, to the frame 60-2 that is rotatably connected to the actuator unit 25-2, output torque based on a driving current supplied from the driver 27-2, as the assistance force. The assistance force, which may also be referred to as the assistance torque, is the force applied by using the actuator unit 25-2 which acts as a rotational axis. The actuator unit 25-2 is disposed at a location corresponding to a joint of the wearer in the suit mechanism unit 20-2. Furthermore, the value of the assistance torque applied with the actuator unit 25-2 is fed back to the control device 26-2. In the present embodiment, the actuator unit 25-2 includes an electric motor acting as a driving source and a gear mechanism for decelerating and transmitting the rotational driving force of the motor.

The communications device 28-2 is a communications unit including communications equipment such as a communication modem and a router connected to a public line or the Internet, for sending various data items obtained by the wearable motion-assist device 10-2 to the wearable motion-assist device 10-1.

The body temperature measuring unit 29-2 is, for example, a temperature sensor for measuring the body temperature of thighs and shins, etc., produced by the motion of the patient 2. An example is a thermistor that outputs body temperature detection signals indicating the body temperature.

In the present embodiment, the wearable motion-assist devices 10-1 and 10-2 are assumed to have the same functions; however, the wearable motion-assist devices 10-1 and 10-2 may have different functions. For example, in the present embodiment, the wearable motion-assist device 10-1 used by the doctor 1 does not transmit monitoring information, and therefore the monitoring information sending function may be omitted. In the wearable motion-assist device 10-2 of the patient 2, the monitoring information is not displayed, and therefore the information display device 31 is not used. For this reason, the information display device 31 need not be provided in the wearable motion-assist device 10-2, and therefore the information display device 31 is not shown on the side of the wearable motion-assist device 10-2 in FIG. 2.

Furthermore, for example, in a case where the patient 2 wears the wearable motion-assist device 10-2 only on his/her right or left leg, there is only one actuator unit 25-2 provided in the wearable motion-assist device 10-2. In such a case, the wearable motion-assist device 10-1 of the doctor 1 does not need to be a wearable type as shown in FIG. 1. For example, the actuator unit 25-1 of the wearable motion-assist device 10-1 may be a lever that functions in coordination with the actuator unit 25-2 of the wearable motion-assist device 10-2.

A description is given of a configuration example of the suit mechanism units 20-1 and 20-2.

Figure 3:
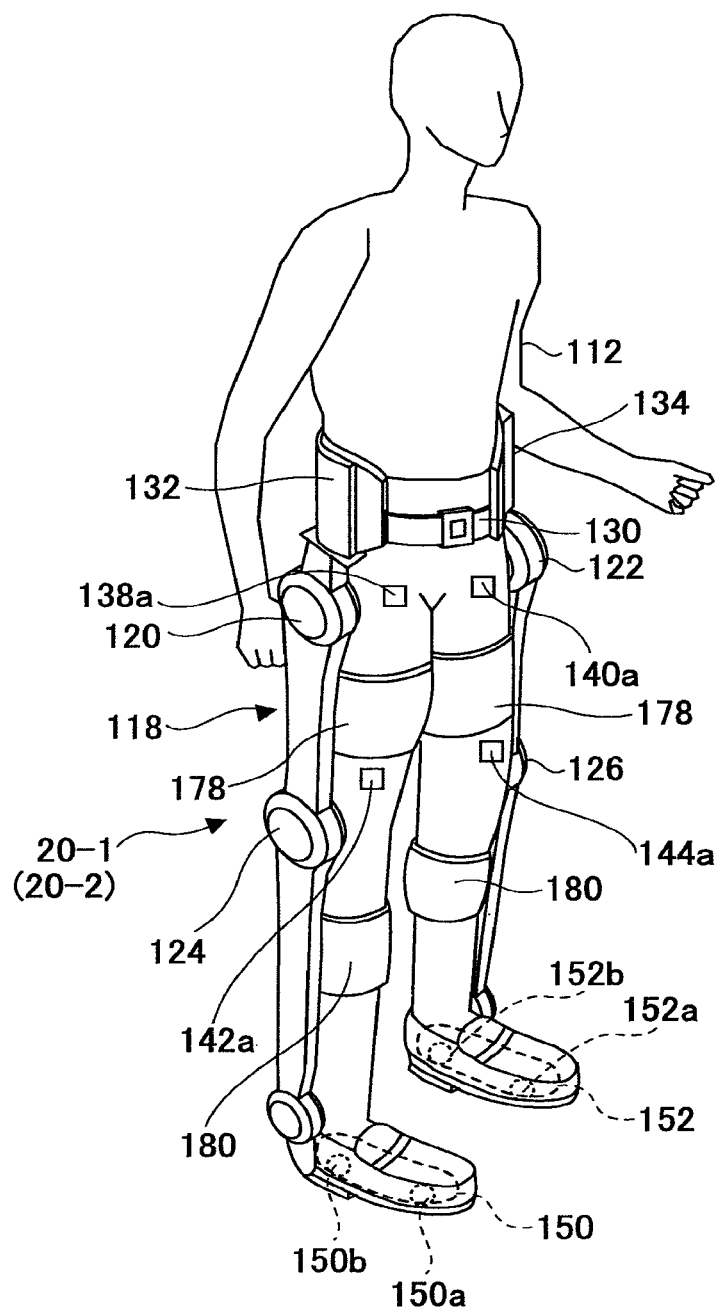
FIG. 3 is a perspective front view of a suit mechanism unit 20-1 (20-2) being worn by a wearer.
Figure 4:
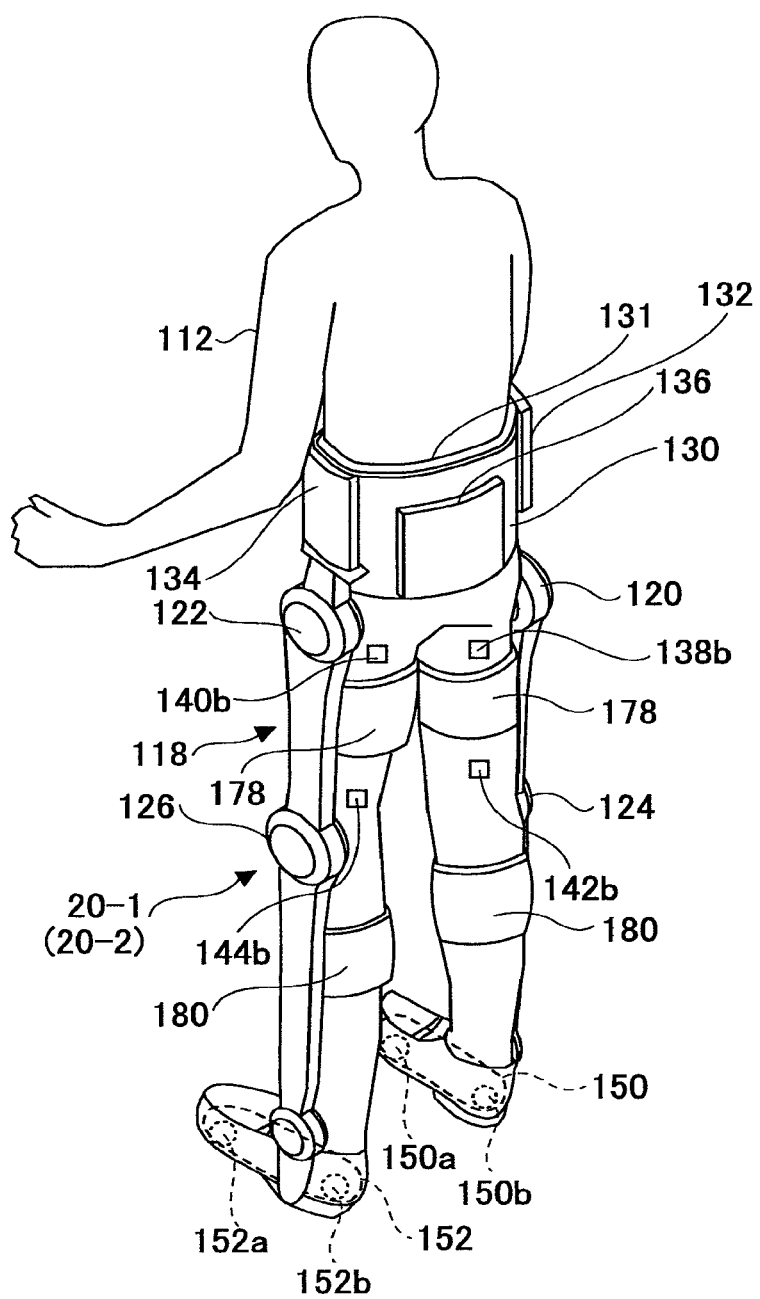
FIG. 4 is a perspective back view of the suit mechanism unit 20-1 (20-2) being worn by the wearer.

FIG. 3 is a perspective front view of the suit mechanism unit 20-1 (20-2) being worn by a wearer. FIG. 4 is a perspective back view of the suit mechanism unit 20-1 (20-2) being worn by a wearer.

As shown in FIGS. 3 and 4, when a wearer 112 who is wearing the suit mechanism unit 20-1, 20-2 attempts to walk by his/her own intention, a pertinent biological signal is generated, and a driving torque corresponding to such a biological signal is applied as an assistance force. Accordingly, the wearer 112 can walk with, for example, half as much muscle force required for walking under regular conditions. Thus, the wearer 112 can walk with the resultant force obtained by adding together the muscle force of himself/herself supporting his/her weight, and the driving torque from the actuator unit 25-1, 25-2 (in the present embodiment, an electric driving motor is used).

Under such conditions, in the wearable motion-assist device 10-1, 10-2, detection signals of a biological signal detecting sensor and an assistance force (motor torque), which force is applied as the center of gravity moves in accordance with the walking motion, are controlled in such a manner as to carry out the motion intended by the wearer 112, as described below. Therefore, the actuator of the wearable motion-assist device 10-1, 10-2 is controlled so as not to apply a load that counters the intended motion of the wearer 112, and not to obstruct the motions of the wearer 112.

The wearable motion-assist device 10-1, 10-2 may assist motions other than a walking motion, such as when the wearer 112 stands up from a chair, or when the wearer 112 sits down onto a chair. Furthermore, the wearable motion-assist device 10-1, 10-2 may also provide power assistance when the wearer 112 walks up stairs or walks down stairs. When the muscle forces of a patient have decreased significantly, it is difficult to walk up stairs and stand up from a chair. However, the wearer 112 wearing the wearable motion-assist device 10-1, 10-2 can receive driving torque in accordance with his/her own intention, and can therefore move regardless of decreased muscle forces.

The suit mechanism unit 20-1, 20-2 is constituted by providing a driving unit on a frame mechanism 118 worn by the wearer 112. The driving unit includes a right thigh driving motor 120 located along the right hip joint of the wearer 112, a left thigh driving motor 122 located along the left hip joint of the wearer 112, a right knee driving motor 124 located along the right knee joint of the wearer 112, and a left knee driving motor 126 located along the left knee joint of the wearer 112. Each of these driving motors 120, 122, 124, and 126 is an electric motor such as a DC motor or an AC motor whose driving torque is controlled by control signals from the control device. Furthermore, each of the driving motors 120, 122, 124, and 126 includes a decelerating mechanism (built inside the driving unit) for decelerating the motor rotational speed by a predetermined reduction ratio, and can therefore generate a sufficient driving force despite the compact size. As a matter of course, the driving motor may be an ultrasonic motor having a thin shape so that it occupies a small space.

A belt-type waist fastening member 130 that is worn around the hips of the wearer 112 has batteries 132 and 134 attached, functioning as power sources for driving the driving motors 120, 122, 124, and 126. The batteries 132 and 134 are rechargeable type batteries, and are provided separately on the left and right so as not to hamper the walking motion of the wearer 112.

Furthermore, a control unit 136 is attached to the back side of the waist fastening member 130, which corresponds to the back side of the wearer 112. The control unit 136 accommodates the above-described control device 26-1 (26-2) and the communications device 28-1 (28-2).

The bioelectrical signal detecting unit 23-1 (23-2) includes biological signal detecting sensors 138a and 138b for detecting the bioelectrical potential generated in accordance with the motion of the right thigh of the wearer 112, biological signal detecting sensors 140a and 140b for detecting the bioelectrical potential generated in accordance with the motion of the left thigh of the wearer 112, biological signal detecting sensors 142a and 142b for detecting the bioelectrical potential generated in accordance with the motion of the right knee of the wearer 112, and biological signal detecting sensors 144a and 144b for detecting the bioelectrical potential generated in accordance with the motion of the left knee of the wearer 112.

These biological signal detecting sensors 138a, 138b, 140a, 140b, 142a, 142b, 144a, and 144b are biological signal detecting units for detecting bioelectrical signals such as myoelectric potential signals and neurotransmission signals through the skin, and each includes an electrode (not shown) for detecting a faint potential. In the present embodiment, the biological signal detecting sensors 138a, 138b, 140a, 140b, 142a, 142b, 144a, and 144b are attached so as to adhere to the skin surface of the wearer 112 with adhesive stickers covering the peripheries of the electrodes.

In the human body, in response to a command from the brain, acetylcholine, which is a synaptic transmitter, is discharged to the surface of the muscle forming a skeletal muscle. As a result, the ion permeation of the sarcolemmal membrane changes and an action potential is generated. The muscle fiber contracts due to the action potential, thereby generating a muscle force. Accordingly, the muscle force generated during the walking motion can be estimated by detecting the potential of the skeletal muscle, so that the assistance force required for the walking motion can be obtained from a virtual torque that is based on this estimated muscle force.

Accordingly, the control device 26-1 (26-2) obtains the driving currents to be supplied to the four driving motors 120, 122, 124, and 126 based on the biological signals detected by the biological signal detecting sensors 138a, 138b, 140a, 140b, 142a, 142b, 144a, and 144b. Then, as the control device 26-1 (26-2) drives the driving motors 120, 122, 124, and 126 with the driving currents thus obtained, an assistance force (motor torque) is applied so that the walking motion of the wearer 112 can be assisted.

Furthermore, in order to make the center of gravity move smoothly during the walking motion, it is necessary to detect the load applied onto the soles of the wearer 112 to detect the position of the center of gravity. Accordingly, on the right and left soles of the wearer 112, a load measuring unit 150 and a load measuring unit 152 are respectively provided, where each load measuring unit measures the load of at least two locations on the corresponding sole (indicated by dashed lines in FIGS. 3 and 4).

The load measuring units 150 and 152 are provided so as to adhere to the soles, and to detect the reactive forces that vary as the weight of the body moves in accordance with the walking motion.

Figure 5:
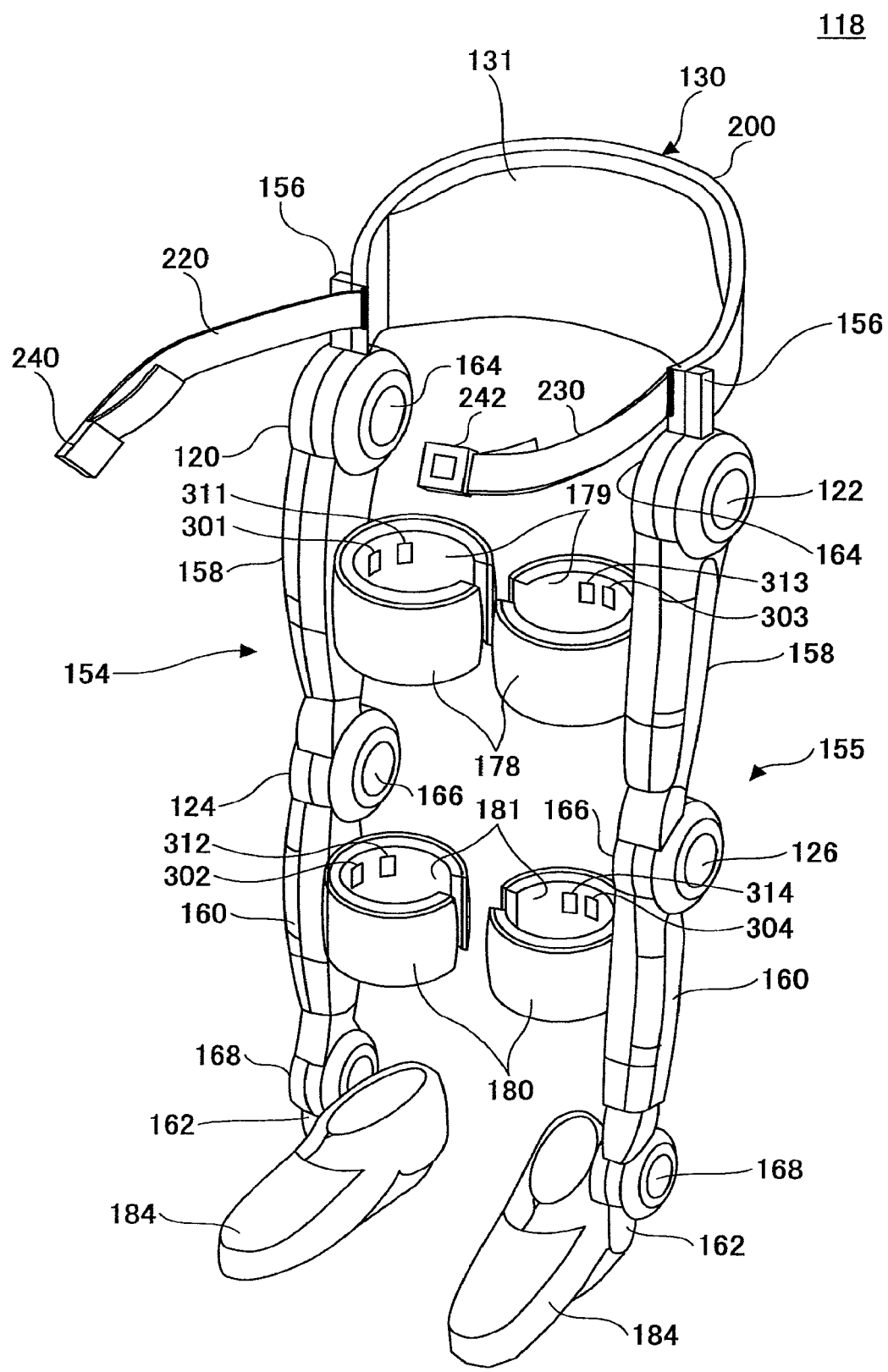
FIG. 5 is a perspective view of a frame mechanism 118 that is not being worn.

FIG. 5 is a perspective view of the frame mechanism 118 that is not being worn. As shown in FIG. 5, the frame mechanism 118 includes the waist fastening member 130 that is worn around the hips of the wearer 112, a right leg assisting unit 154 extending downward from the right side of the waist fastening member 130, and a left leg assisting unit 155 extending downward from the left side of the waist fastening member 130. On the back side of the waist fastening member 130, there is provided a fitting part 131 that comes in close contact with the backs of the hips of the wearer 112 without any gaps.

The right leg assisting unit 154 and the left leg assisting unit 155 are symmetrically disposed. The right leg assisting unit 154 and the left leg assisting unit 155 each includes a bracket 156 fixed to the waist fastening member 130 and a first frame 158 extending downward from the bracket 156 along the corresponding outer thigh of the wearer 112. Furthermore, the right leg assisting unit 154 and the left leg assisting unit 155 each includes a second frame 160 extending downward from the first frame 158 along the corresponding outer shin of the wearer 112, as well as a third frame 162 on which the foot sole (or the shoe sole if a shoe is worn) of the wearer 112 is placed.

In between the bottom edge of the bracket 156 and the top edge of the first frame 158, there is provided a first joint 164 having a shaft bearing structure, by which the bracket 156 and the first frame 158 are connected in a rotatable manner. The first joint 164 is provided at a position corresponding to the height of the hip joint, and the bracket 156 is joined to the bearing side of the first joint 164 while the first frame 158 is joined to the rotating side of the first joint 164. Furthermore, the first joint 164 has a built-in driving motor 120, 122, and the first joint 164 and the driving motor 120, 122 appear to be a single unit.

In between the bottom edge of the first frame 158 and the top edge of the second frame 160, there is provided a second joint 166 having a shaft bearing structure, by which the first frame 158 and the second frame 160 are connected in a rotatable manner. The second joint 166 is provided at a position corresponding to the height of the knee joint, and the first frame 158 is joined to the bearing side of the second joint 166 while the second frame 160 is joined to the rotating side of the second joint 166. Furthermore, the second joint 166 has a built-in driving motor 124, 126, and the second joint 166 and the driving motor 124, 126 appear to be a single unit.

In between the bottom edge of the second frame 160 and the top edge of the third frame 162, there is provided a third joint 168 having a shaft bearing structure, by which the second frame 160 and the third frame 162 are connected in a rotatable manner. A shoe 184 is fixed on the inner side of the third frame 162, whereby the shoe 184 is worn by the foot of the wearer 112.

In the present embodiment, the aforementioned load measuring unit 150, 152 is disposed inside the shoe 184. Thus, when the wearer 112 is wearing the shoe 184, the foot sole of the wearer 112 is maintained in contact with the load measuring unit 150, 152.

Accordingly, the first frame 158 and the second frame 160 are attached in such a manner that a walking motion can be performed by using the first joint 164 and the second joint 166 as the rotation fulcrums with respect to the bracket 156 fixed to the waist fastening member 130. That is, the first frame 158 and the second frame 160 are configured to move in the same manner as the leg of the wearer 112. Furthermore, the third joint 168 is located beside the ankle of the wearer 112. Therefore, the angle between the shoe 184 and the floor (or the ground) changes in accordance with the ankle of the wearer 112, as the third joint 168 rotates for performing a walking motion.

Furthermore, the rotating shafts of the driving motors 120, 122, 124, and 126 of the first joints 164 and the second joints 166 transmit driving torques to the first frames 158 and the second frames 160 that are driven via gear mechanisms.

Furthermore, each of the driving motors 120, 122, 124, and 126 has the angle detecting unit 24-1 (24-2). For example, an angle sensor is used as the angle detecting unit 24-1 (24-2). The angle sensor is, for example, a rotary encoder for counting the number of pulses proportional to the joint angle of each of the first joint 164 and the second joint 166, and outputting, as the sensor output, electric signals in accordance with the number of pulses corresponding to the joint angles.

The angle sensor of the first joint 164 is for detecting the rotational angle between the bracket 156 and the first frame 158, which corresponds to the joint angle of the hip joint of the wearer 112. Furthermore, the angle sensor of the second joint 166 is for detecting the rotational angle between the bottom edge of the first frame 158 and the second frame 160, which corresponds to the joint angle of the knee joint of the wearer 112.

Furthermore, a belt-type thigh fastening member 178 is attached to the first frame 158, at the mid position in the longitudinal direction of the first frame 158. The thigh fastening member 178 holds the thigh of the wearer 112. On the inner surface of the thigh fastening member 178, there is provided a fitting part 179 that comes in close contact with the thigh of the wearer 112 without any gaps.

Furthermore, a belt-type shin fastening member 180 is attached to the second frame 160, at the mid position in the longitudinal direction of the second frame 160. The shin fastening member 180 holds the shin below the knee of the wearer 112. On the inner surface of the shin fastening member 180, there is provided a fitting part 181 that comes in close contact with the shin of the wearer 112 without any gaps.

The driving torques generated by the driving motors 120, 122, 124, and 126 are transmitted to the corresponding first frames 158 and second frames 160 via gears, and are also transmitted, as assistance forces, to the legs of the wearer 112 via the thigh fastening members 178 and the shin fastening members 180.

On the inner surfaces of the fitting part 179 and the fitting part 181 of the thigh fastening member 178 and the shin fastening member 180, respectively, there are provided temperature sensors 301 through 304 for measuring the body temperature of the wearer 112, as well as temperature adjusting elements 311 through 314 constituting a sensing unit for feeling the body temperature of another wearer. For example, a thermistor that outputs body temperature detection signals indicating the body temperature of the wearer 112 is used as each of the temperature sensors 301 through 304. For example, a Peltier element that is cooled or heated to a temperature corresponding to an applied current is used as each of the temperature adjusting elements 311 through 314.

The temperature adjusting elements 311 through 314 are heated or cooled so that the wearer 112, who is wearing the wearable motion-assist device 10-1 with these elements, can sense the body temperature detected by the temperature sensors 301 through 304 of the wearable motion-assist device 10-2 worn by another wearer. Accordingly, the wearer 112 (doctor 1) can sense the changes in the body temperature of the wearer (patient 2) who is wearing the other wearable motion-assist device 10-2.

Each of the frames 158, 160, and 162 includes an elastic resin material covering a light-weight metal material made of duralmin or the like. Accordingly, the weight of the frame mechanism 118 can be supported, which includes the batteries 132, 134, and the control unit 136, attached to the waist fastening member 130. That is, the weight of the frame mechanism 118 is not applied to the wearer 112, so that an excessive load is not applied to the wearer 112.

The waist fastening member 130 includes belts 220 and 230, a buckle 240 attached to the end of one belt 220, and a metal latch 242 attached to the end of the other belt 230. The waist fastening member 130 holds the hips of the wearer 112 by the joining of the metal latch 242 and the buckle 240 and the adjusting of the lengths of the belts 220 and 230.

Figure 6:
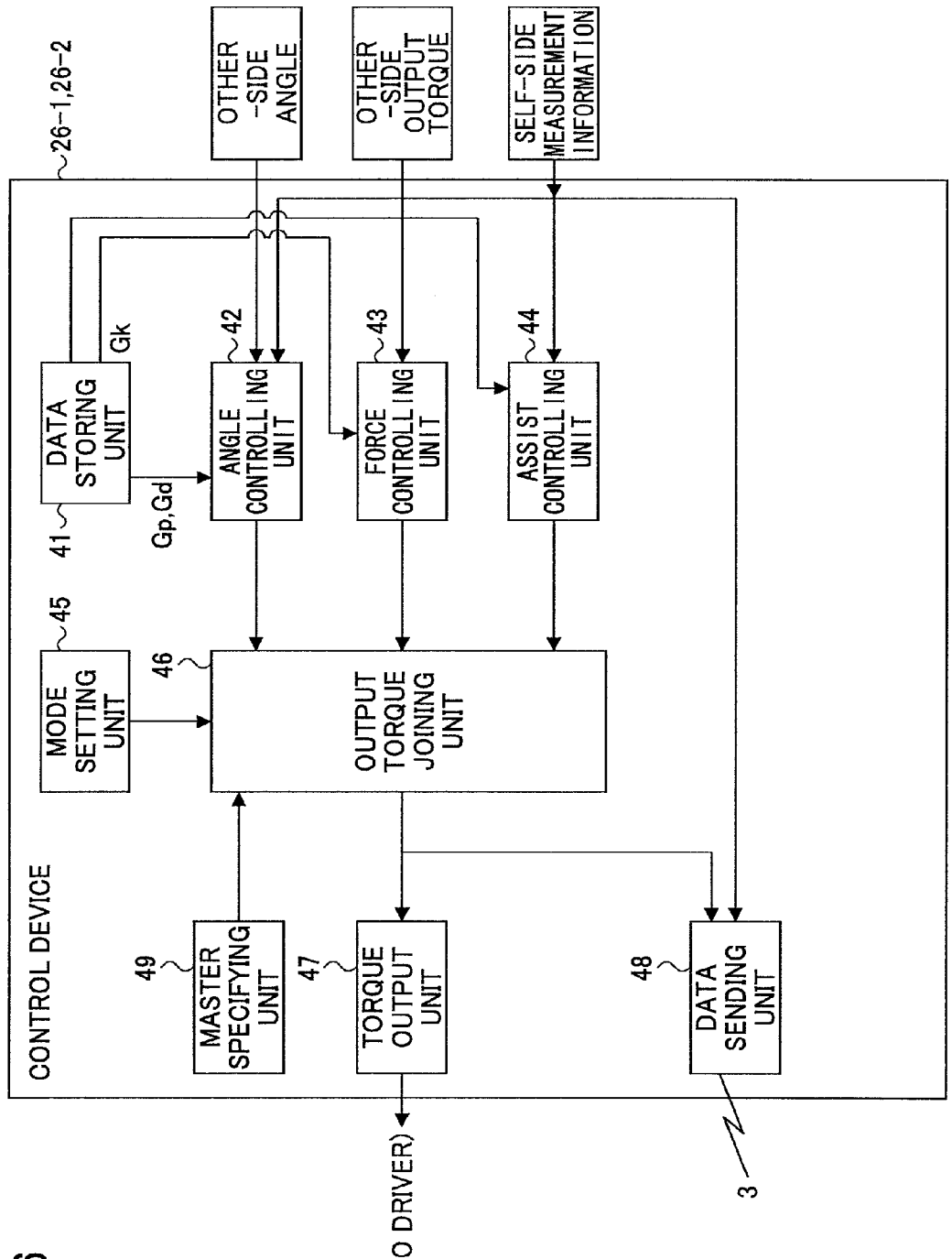
FIG. 6 is a block diagram of a control device of the wearable motion-assist device according to an embodiment of the present invention.

FIG. 6 is a block diagram of the control device of the wearable motion-assist device according to an embodiment of the present invention. As shown in FIG. 6, the control device 26-1, 26-2 includes a data storing unit 41, an angle controlling unit 42, a force controlling unit 43, an assist controlling unit 44, a mode setting unit 45, an output torque adding unit 46, a torque output unit 47, a data sending unit (data transfer unit) 48, and a master specifying unit (specifying unit) 49.

The data storing unit 41 stores parameters that are used in the angle controlling unit 42, the force controlling unit 43, and the assist controlling unit 44.

The angle controlling unit 42 implements control by using an "other-side joint angle" sent from the wearable motion-assist device of the other side, and using an "other-side angular speed" obtained from this "other-side joint angle" as a target value. That is, the angle controlling unit 42 implements control so that the joint angle and the joint angular speed of the wearable motion-assist device of the other side correspond to those of the wearable motion-assist device to which it belongs (self-side). One example of target tracking control is PD control. In a case where PD control is implemented, the angle control output torque is calculated by the following formula:

$$\text{angle control output torque} = Gp^*([\text{other-side joint angle}] - [\text{self-side joint angle}]) + Gd^*([\text{other-side joint angular speed}] - [\text{self-side joint angular speed}]) \quad (1)$$

Gp and Gd are control parameters supplied from the data storing unit 41. Control parameters may be predetermined values or functional values. The angular speed is calculated from angle information.

The force controlling unit 43 implements control so that the self-side output torque corresponds to or becomes proportional to the other-side output torque sent from the other-side wearable motion-assist device.

For example, in a case where control is implemented so that the self-side output torque becomes proportional to the other-side output torque, the force is controlled according to the following formula.

$$\text{force control output torque} = Gk^*[\text{other-side torque}] \quad (2)$$

Gk is an output torque adjustment parameter supplied from the data storing unit 41.

The assist controlling unit 44 is for outputting assist control output torque based on the output torque from the actuator part and the joint angles of the self-side wearable motion-assist device 10-1 (10-2), bioelectrical signals (for example, myoelectric potential signals, neurotransmission signals, and brain wave detection signals) generated by the wearer 112 wearing the self-side wearable motion-assist device 10-1 (10-2), and the relative force applied to the frame mechanism 118 of the self-side wearable motion-assist device 10-1 (10-2). The assist controlling unit 44 is further described below.

The mode setting unit 45 is for setting the control method when implementing the rehabilitation, according to input operations from the wearer 112. The mode setting unit 45 selects and sets a control mode from among an angle control mode, a force control mode, and a hybrid control mode in which the angle control mode and the force control mode are simultaneously performed.

The angle control mode is for implementing control so that the joint angle and the joint angular speed of the self-side wearable motion-assist device correspond to those of the other-side wearable motion-assist device. In this mode, the force control output torque sent from the force controlling unit 43 is not used.

The force control mode is for implementing control so that the output torque of the self-side corresponds to or becomes proportional to the output torque of the other-side that is sent from the other-side wearable motion-assist device. In this mode, the angle control output torque sent from the angle controlling unit 42 is not used.

The hybrid control mode is a combination of the angle control mode, which is for implementing control so that the joint angle and the joint angular speed of the self-side wearable motion-assist device correspond to those of the other-side wearable motion-assist device; and the force control mode, which is for implementing control so that the output torque of the self-side corresponds to or becomes proportional to the output torque of the other-side that is sent from the other-side wearable motion-assist device.

The output torque adding unit 46 is for outputting torque in accordance with the mode set by the mode setting unit 45.

Specifically, when the angle control mode is set, the output torque is obtained by the following formula.

$$(\text{output torque}) = (\text{angle control output torque}) + (\text{assist control output torque}) \quad (3)$$

When the force control mode is set, the output torque is obtained by the following formula.

$$(\text{output torque}) = (\text{force control output torque}) + (\text{assist control output torque}) \quad (4)$$

When the hybrid control mode is set, the output torque is obtained by the following formula.

$$(\text{output torque}) = (\text{angle control output torque}) + (\text{force control output torque}) + (\text{assist control output torque}) \quad (5)$$

In each mode, the assist control output torque is added; however, there may be a setup where the assist control output torque is not added.

The torque output unit 47 is for outputting the output torque output from the output torque adding unit 46 to the motor via the driver of the self-side wearable motion-assist device.

The data sending unit 48 is for sending the output torque output from the output torque adding unit 46 and the joint angle detected by the angle detecting unit of the self-side wearable motion-assist device, to the other-side wearable motion-assist device via the network 3.

Furthermore, the data sending unit 48 sends data to the information display device on the other-side with the communications device 28-1 (28-2) via the network 3. Specifically, this data is obtained by detection/measurement performed by the angle detecting unit 24-1 (24-2), the bioelectrical signal detecting unit 23-1 (23-2), the relative force detecting unit 22-1 (22-2), and the biological information measuring unit 21-1 (21-2); or this data calculated based on the data that has been obtained by such detection/measurement. The data sent by the data sending unit 48 includes, for example, the output torque, the joint angle, the muscle torque, the motor torque, the bioelectrical potential, the cardiac potential, and monitoring information such as body temperature.

The master specifying unit 49 is for specifying the control unit of an arbitrary wearable motion-assist device among plural wearable motion-assist devices, as a master control unit. For example, the master specifying unit 49 is a switch member or a remote controller that sends out a wireless signal such as infrared rays, which is operated manually by the wearer 112, for specifying the control unit of an arbitrary wearable motion-assist device as a master control unit.

Figure 7:
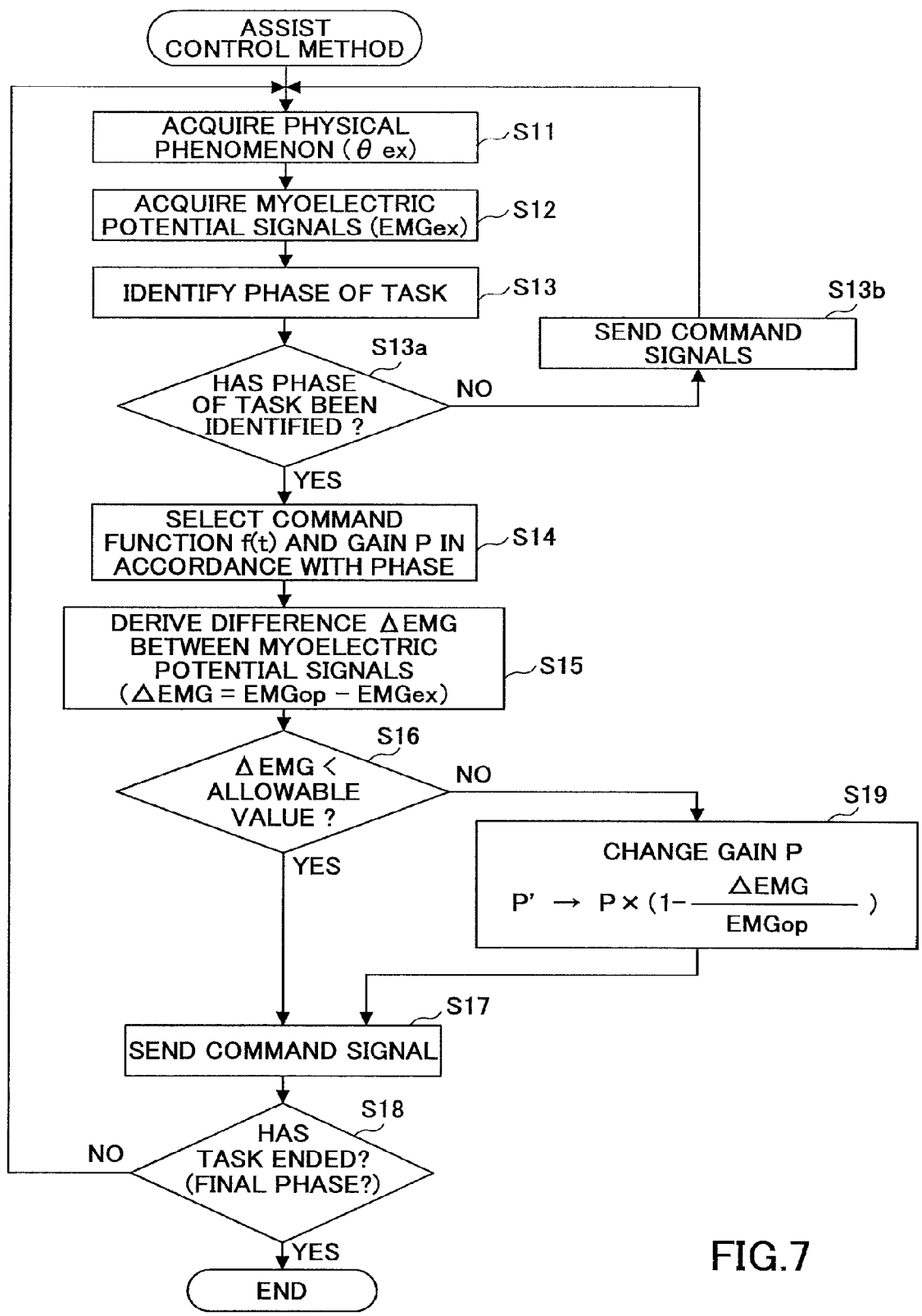
FIG. 7 is a flowchart for describing procedures of an assist control method executed by the control device 26-1 (26-2)

With reference to a flowchart shown in FIG. 7, a description is given of procedures of an assist control method executed by the control device 26-1 (26-2) in accordance with a walking motion of the wearer 112 while the wearer 112 is wearing the frame mechanism 118 as described above. As shown in FIG. 7, in step S11, the control device 26-1 (26-2) acquires the joint angle (θ ex) detected by the angle detecting unit 24-1 (24-2). Next, in step S12, the control device 26-1 (26-2) acquires myoelectric potential signals (EMGex) detected by the myoelectric potential sensors 138a, 138b, 140a, 140b, 142a, 142b, 144a, and 144b of the bioelectrical signal detecting unit 23-1 (23-2).

Next, in step S13, the control device 26-1 (26-2) cross-checks the joint angle (θ ex) and the myoelectric potential signals (EMGex) acquired in steps S11 and S12, with a reference parameter database (not shown), and identifies the phase of the task corresponding to the motion of the wearer 112. The reference parameter database stores variation patterns of myoelectric potential signals, neurotransmission signals, and joint angles, in accordance with phases (motion units obtained by dividing a series of motions). By cross-checking a joint angle (θ op) and myoelectric potential signals (EMGop) stored in this reference parameter database with the joint angle (θ ex) and myoelectric potential signals (EMGex) acquired in steps S11 and S12, the control device 26-1 (26-2) identifies the phase of the task corresponding to the motion of the wearer 112.

Next, in step S13a, the control device 26-1 (26-2) determines whether the phase of the task has been identified. In step S13a, in the event that the myoelectric potential signals (EMGex) do not correspond to those in the reference parameter database and the phase cannot be identified, the process proceeds to step S13b, where command signals (voluntary control signals) are generated based on the myoelectric potential signals (EMGex) acquired in step S12. For example, the voluntary control signals are generated by amplifying the myoelectric potential signals (EMGex) based on a predetermined gain (Pb) that has been set in advance (voluntary control unit).

In step S13a, in the event that the phase is identified, the process proceeds to step S14, where a command function f(t) and a gain P are selected in accordance with the phase identified in step S13 (autonomous control unit).

Then, in step S15, the difference between biological signals (EMGop) and the myoelectric potential signals (EMGex) is calculated to derive ΔEMG (=EMGop-EMGex) (difference deriving unit). Specifically, the biological signals (EMGop) are reference parameters corresponding to the joint angle detected by the angle detecting unit 24-1 (24-2), and the myoelectric potential signals (EMGex) are detected by the myoelectric potential sensors 138a, 138b, 140a, 140b, 142a, 142b, 144a, and 144b of the bioelectrical signal detecting unit 23-1 (23-2).

Next, in step S16, the control device 26-1 (26-2) compares the difference ΔEMG calculated at step S15 with an allowable value (threshold value) set in advance, and confirms whether the difference ΔEMG is less than the allowable value. In step S16, if the difference ΔEMG is less than the allowable value, the myoelectric potential of the joint motion of the wearer 112 corresponds to the motion of the wearer 112. Therefore, the control device 26-1 (26-2) determines that the driving torques from the driving motors 120, 122, 124, and 126 of the actuator unit 25-1 (25-2) can be applied as assistance forces to the corresponding legs of the wearer 112.

Thus, in step S16, in the event that the difference ΔEMG is less than the allowable value, the process proceeds to step S17, where the torque output unit 47 sends a torque command signal to the motor driver 27-1 (27-2). Accordingly, the driving motors 120, 122, 124, and 126 of the actuator unit 25-1 (25-2) generate driving torques based on the joint angle (θ ex) and the myoelectric potential signals (EMGex) obtained from the wearer 112. The driving torques are transmitted as assistance forces to the corresponding legs of the wearer 112 via the first frames 158, the second frames 160, the thigh fastening members 178, and the shin fastening members 180.

In step S16, if the ΔEMG exceeds the allowable value, the myoelectric potential of the joint motion of the wearer 112 does not correspond to the motion of the wearer 112. Therefore, the control device 26-1 (26-2) determines that the driving torques from the driving motors 120, 122, 124, and 126 do not correspond to the motion that the wearer 112 has intended to make. Accordingly, in step S16, in the event that the ΔEMG is greater than or equal to the allowable value, the process proceeds to step S19, where a process of changing the gain P is performed. That is, in step S19, the control device 26-1 (26-2) changes the gain P to a corrected gain P' by a formula of gain $P'=P\times\{1-(\Delta EMG/EMGop)\}$.

In step S17, the command signal (control signal) is generated by using the corrected gain P'. As the corrected gain P' has been corrected according to the myoelectric potential signals EMGex, this command signal is more reflective of the wearer's intention, compared to the case of using the gain P before being corrected. Thus, a control signal that is more reflective of the wearer's intention compared to the case of using the gain P before being corrected, is supplied to the motor driver 27-1 (27-2). Consequently, the driving motors 120, 122, 124, and 126 generate driving torques that are lower than the case of using the gain P (hybrid control unit which is a combination of voluntary control and autonomous control).

As a result, the driving motors 120, 122, 124, and 126 can generate driving torques based on the actual measurement of the myoelectric potential signals (EMGex) corresponding to the intention of the wearer 112, regardless of the phase of the motion. These driving torques can be sent as assistance forces to the corresponding legs of the wearer 112 via the first frames 158, the second frames 160, the thigh fastening members 178, and the shin fastening members 180.

As described above, a process of changing the gain P is performed at step S19. Therefore, even in a case where the wearer 112 aborts a motion (phase) while making the motion, and intends to make a different motion (phase), the assistance force decreases at the time point when the myoelectric potential signal of the wearer 112 declines. Accordingly, the assistance force can be controlled so as not to force the wearer 112 to make the initial (before correction) movement counter to the intention of the wearer 112. Thus, as described above, the wearer 112 can be provided with an assistance force in line with the intention of the wearer 112, by a control method which is a combination of autonomous control and voluntary-like control that is approximate to voluntary control.

In step S18, the control device 26-1 (26-2) confirms whether a control process for the final phase of the corresponding task has been performed. In step S18, when it is determined that the control process for the final phase of the corresponding task has not yet been performed, the process returns to step S11, and the control process for the next phase is performed (steps S11 through S18). Furthermore, in step S18, when it is determined that the control process for the final phase of the corresponding task has been performed, the current control process ends.

Figure 8:
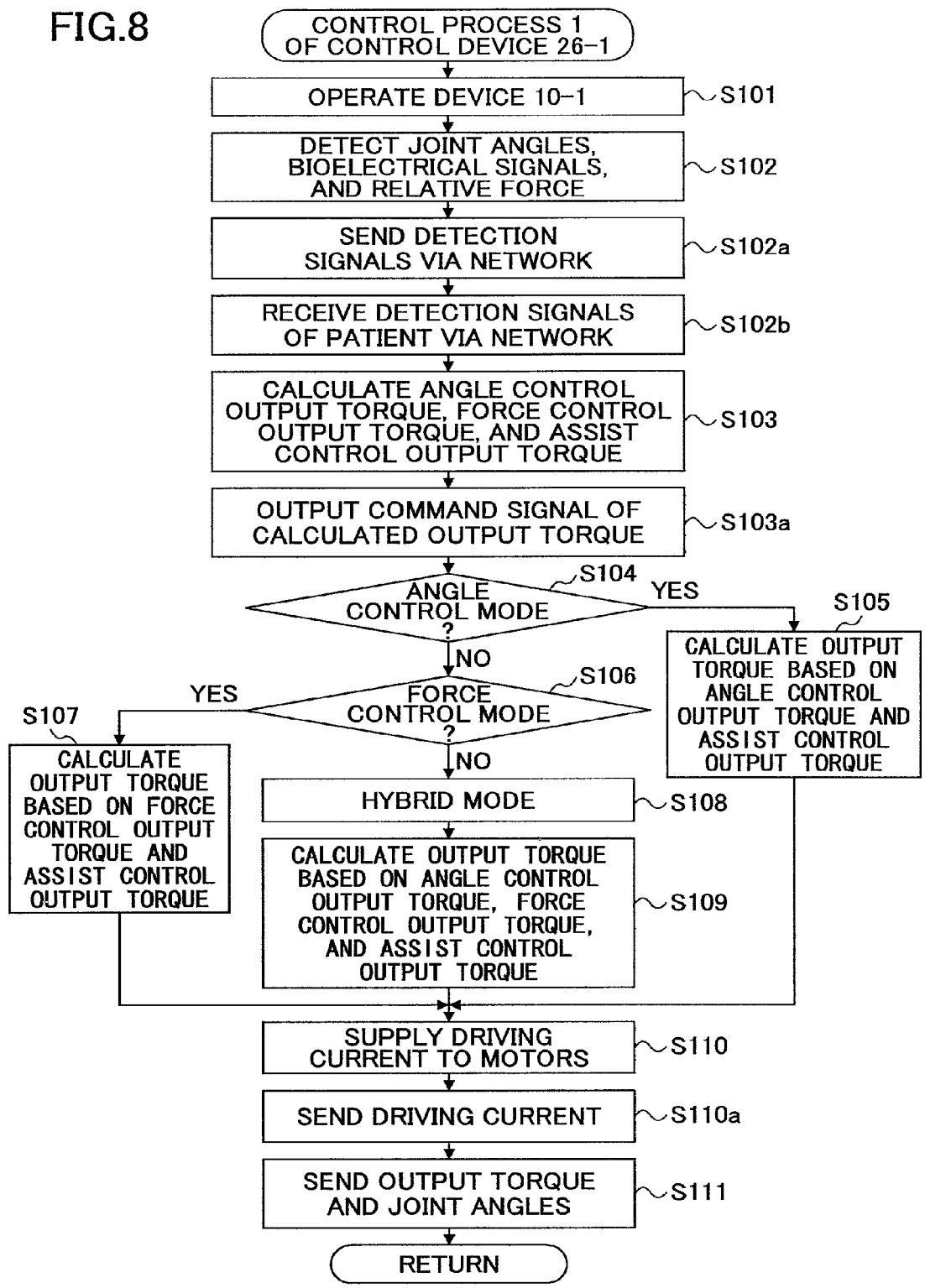
FIG. 8 is a flowchart for describing a control process 1 performed by the control device 26-1 of the wearable motion-assist device of the doctor, according to a first embodiment of the present invention.
Figure 9:
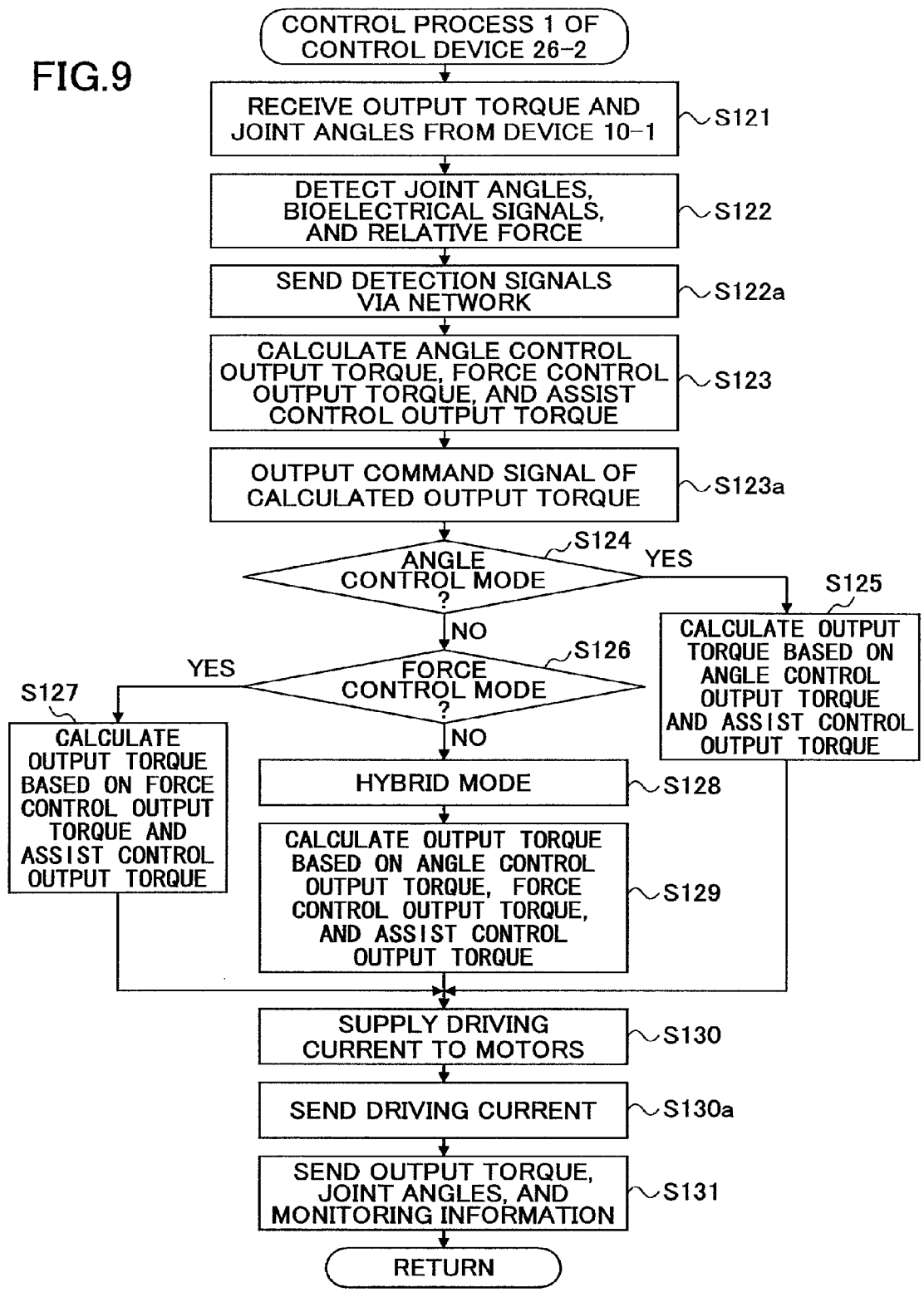
FIG. 9 is a flowchart for describing a control process 1 performed by the control device 26-2 of the wearable motion-assist device of the patient, according to the first embodiment of the present invention.

Next, with reference to the flowcharts shown in FIGS. 8 and 9, a description is given of operations of the motion-assist system according to an embodiment of the present invention. FIG. 8 is a flowchart for describing a control process 1 performed by the control device 26-1 of the wearable motion-assist device 10-1 of the doctor 1. FIG. 9 is a flowchart for describing a control process 1 performed by the control device 26-2 of the wearable motion-assist device 10-2 of the patient 2.

In the present embodiment, a description is given of a case where the doctor 1 conducts rehabilitation training for the patient. However, the present invention is not so limited. For example, the present invention is obviously also applicable to a case where an instructor conducts training for a trainee.

In this case, it is assumed that the doctor 1 wearing the wearable motion-assist device 10-1 and the patient 2 wearing the wearable motion-assist device 10-2 are at remote locations from one another, and that the doctor 1 conducts the rehabilitation for the patient 2 via the network 3.

The doctor 1 is wearing the wearable motion-assist device 10-1, and can thus sense the state of the patient 2 wearing the wearable motion-assist device 10-2 in a real-time manner via the suit mechanism unit 20-1.

In this case, the doctor 1 operates the wearable motion-assist device 10-1 to start conducting the rehabilitation motions for the patient (step S101).

Next, the angle detecting unit 24-1 of the wearable motion-assist device 10-1 detects joint angles of the suit mechanism unit 20-1, and the bioelectrical signal detecting unit 23-1 detects bioelectrical signals (for example, myoelectric potential signals and neurotransmission signals) that are generated when the doctor 1 moves muscles around his/her joints. Furthermore, the relative force detecting unit 22-1 detects the relative force that is determined by the relationship between the output torque of the actuator unit 25-1 and the muscle force of the doctor who is the wearer. Then, the body temperature of the doctor 1 (body temperature at thighs and shins) is detected with the temperature sensors 301 through 304 of the body temperature measuring unit 29-1. Then, these detection signals are read (step S102).

Next, the respective detection signals indicating the joint angles, the bioelectrical signals, the relative force, and the body temperature calculated at step S102, are sent to the other wearable motion-assist device 10-2 via the communications device 28-1 (28-2) and the network 3 (step S102*a*).

Next, the detection signals of the joint angles, the bioelectrical signals, the relative force, and the body temperature detected in the wearable motion-assist device 10-2 of the patient, are received via the communications device 28-1 (28-2) and the network 3 (step S102*b*).

The angle controlling unit 42 of the control device 26-1 calculates angle control output torque for implementing control so that the joint angles and the joint angular speed of the wearable motion-assist device 10-1 of the doctor 1 correspond to the joint angles and the joint angular speed of the wearable motion-assist device 10-2 of the patient 2. Furthermore, the force controlling unit 43 of the control device 26-1 calculates force control output torque for implementing control so that the output torque of the actuator unit 25-1 of the wearable motion-assist device 10-1 corresponds to or becomes proportional to the output torque of the actuator unit 25-2 sent from the wearable motion-assist device 10-2 of the patient 2. Furthermore, the assist controlling unit 44 of the control device 26-1 calculates assist control output torque based on the output torque, the joint angles, the bioelectrical potential, and the relative force of the wearable motion-assist device 10-1 (step S103).

Next, the output torque adding unit 46 outputs, to the driver 27-1, torque command signals of the angle control output torque, the force control output torque, and the assist control output torque calculated at step S103 (step S103*a*).

The output torque adding unit 46 of the control device 26-1 determines whether the mode set at the mode setting unit 45 of the control device 26-1 is the angle control mode (step S104). In step S104, when the output torque adding unit 46 determines that the angle control mode is set (YES), the output torque adding unit 46 calculates the output torque by formula (3) based on the angle control output torque and the assist control output torque (step S105).

In step S104, when the output torque adding unit 46 determines that the angle control mode is not set (NO), next, the output torque adding unit 46 determines whether the force control mode is set (step S106). In step S106, when the output torque adding unit 46 determines that the force control mode is set (YES), the output torque adding unit 46 calculates the output torque by formula (4) based on the force control output torque and the assist control output torque (step S107).

In step S106, when the output torque adding unit 46 determines that the force control mode is not set (NO), the output torque adding unit 46 determines that the hybrid mode is set at the mode setting unit 45, which is neither the angle control mode nor the force control mode (step S108). Next, the output torque adding unit 46 calculates the output torque by formula (5) based on the angle control output torque, the force control output torque, and the assist control output torque (step S109).

Subsequently, the output torque adding unit 46 outputs the torque command signals of the output torque calculated at any one of steps S105, S107, and S109, to the driver 27-1 via the torque output unit 47. Then, the driver 27-1 supplies control signals (driving currents at the motors) corresponding to the output torque, to the motors 120, 122, 124, and 126 of the actuator unit 25-1 (step S110).

Next, the control signals (driving currents at the motors) corresponding to the output torque are sent to the other wearable motion-assist device 10-2 via the communications device 28-1 (28-2) and the network 3 (step S110*a*).

Accordingly, the motions of the patient 2 who is at a remote location and the motions of the doctor 1 himself/herself are applied to the wearable motion-assist device 10-1 of the doctor 1. Therefore, the doctor 1 can give rehabilitation instructions while perceiving (sensing) the state (rotational angles of joints, torque, body temperature variations) of the patient 2.

Furthermore, the output torque calculated at any one of steps S105, S107, and S109 and the joint angles of the suit mechanism unit 20-1 detected by the angle detecting unit 24-1 are sent from the data sending unit 48 to the wearable motion-assist device 10-2 of the patient 2 via the communications device 28-1 (28-2) and the network 3 (step S111). Subsequently, the process returns to step S101.

Next, with reference to the flowchart shown in FIG. 9, a description is given of a control process 1 executed by the control device 26-2 in the wearable motion-assist device 10-2 of the patient 2.

The control device 26-2 in the wearable motion-assist device 10-2 of the patient 2 receives the respective detection signals indicating the joint angles, the bioelectrical signals, the relative force, and the body temperature detected in the wearable motion-assist device 10-1 of the doctor 1, via the communications device 28-1 (28-2) and the network 3 (step S121).

Next, the angle detecting unit 24-2 detects the joint angles of the suit mechanism unit 20-2, and the bioelectrical signal detecting unit 23-2 detects bioelectrical signals (for example, myoelectric potential signals and neurotransmission signals) that are generated when the patient 2 moves muscles around his/her joints. The relative force detecting unit 22-2 detects the relative force that is determined by the relationship between the output torque of the actuator unit 25-2 and the muscle force of the patient who is the wearer. Then, the body temperature of the patient (body temperature at thighs and shins) is detected with the temperature sensors 301 through 304 of the body temperature measuring unit 29-2. Next, these detection signals are read (step S122).

Next, the respective detection signals indicating the joint angles, the bioelectrical signals, the relative force, and the body temperature calculated at step S122, are sent to wearable motion-assist device 10-1 via the communications device 28-1 (28-2) and the network 3 (step S122*a*).

The angle controlling unit 42 of the control device 26-2 calculates angle control output torque for implementing control so that the joint angles and the joint angular speed of the wearable motion-assist device 10-2 of the patient 2 correspond to the joint angles and the joint angular speed of the wearable motion-assist device 10-1 of the doctor 1. Furthermore, the force controlling unit 43 of the control device 26-2 calculates force control output torque for implementing control so that the output torque of the actuator unit 25-2 of the wearable motion-assist device 10-2 corresponds to or becomes proportional to the output torque of the actuator unit 25-1 sent from the wearable motion-assist device 10-1 of the doctor 1. Furthermore, the assist controlling unit 44 calculates assist control output torque based on the output torque, the joint angles, the bioelectrical potential, and the relative force of the wearable motion-assist device 10-2 (step S123). Next, the output torque adding unit 46 outputs, to the driver 27-2, torque command signals of the angle control output torque, the force control output torque, and the assist control output torque calculated at step S123 (step S123a).

The output torque adding unit 46 of the control device 26-2 determines whether the mode set at the mode setting unit 45 of the control device 26-2 is the angle control mode (step S124). In step S124, when the output torque adding unit 46 determines that the angle control mode is set (YES), the output torque adding unit 46 calculates the output torque by formula (3) based on the angle control output torque and the assist control output torque (step S125).

In step S124, when the output torque adding unit 46 determines that the angle control mode is not set (NO), next, the output torque adding unit 46 determines whether the force control mode is set (step S126). In step S126, when the output torque adding unit 46 determines that the force control mode is set (YES), the output torque adding unit 46 calculates the output torque by formula (4) based on the force control output torque and the assist control output torque (step S127).

In step S126, when the output torque adding unit 46 determines that the force control mode is not set (NO), the output torque adding unit 46 determines that the hybrid mode is set at the mode setting unit 45, which is neither the angle control mode nor the force control mode (step S128). Next, the output torque adding unit 46 calculates the output torque by formula (5) based on the angle control output torque, the force control output torque, and the assist control output torque (step S129).

Subsequently, the output torque adding unit 46 outputs the torque command signals of the output torque calculated at any one of steps S125, S127, and S129, to the driver 27-2 via the torque output unit 47. Then, the driver 27-2 supplies control signals (driving currents at the motors) corresponding to the output torque, to the motors 120, 122, 124, and 126 of the actuator unit 25-2 (step S130). Next, the control signals (driving currents at the motors) corresponding to the output torque are sent to the other wearable motion-assist device 10-1 via the communications device 28-1 (28-2) and the network 3 (step S130a).

Accordingly, the motions of the patient 2 who is at a remote location and the motions of the doctor 1 himself/herself are applied to the wearable motion-assist device 10-1 of the doctor 1. Therefore, the doctor 1 can give rehabilitation instructions while perceiving (sensing) the state (rotational angles of joints, torque, body temperature variations) of the patient 2.

Furthermore, the output torque calculated at any one of steps S125, S127, and S129 and the joint angles of the suit mechanism unit 20-2 detected by the angle detecting unit 24-2 are sent from the data sending unit 48 to the wearable motion-assist device 10-1 of the doctor 1 via the communications device 28-1 (28-2) and the network 3, and monitoring information is sent to the information display device 31 of the doctor 1 (step S131). Subsequently, the process returns to step S121.

The monitoring information is information used by the doctor 1 for monitoring the state of the patient 2, which may be arbitrarily defined. In the present embodiment, the monitoring information includes joint angles, muscle torque, motor torque, bioelectrical potential, cardiac potential, and body temperature.

By the above process, the state of the suit mechanism unit 20-2 of the patient 2 is applied to the suit mechanism unit 20-1, and the monitoring information is converted into graphs, diagrams, and values and displayed on the information display device 31 on the doctor's side. Accordingly, the doctor can conduct the rehabilitation by referring to biological information, etc., of the patient 2, and applying the information to the rehabilitation.

Therefore, with the motion-assist system according to an embodiment of the present invention, the doctor 1 can sense the state (rotational angles of joints, torque, body temperature variations) of the patient 2 via the wearable motion-assist device 10-2, and can thus objectively recognize the state of the patient 2. As a result, the rehabilitation can be efficiently implemented.

Second Embodiment

Next, a description is given of a motion-assist system according to a second embodiment of the present invention.

In the first embodiment, bi-directional communication is performed between the wearable motion-assist device 10-1 of the doctor 1 and the wearable motion-assist device 10-2 of the patient 2. However, in the present embodiment, the wearable motion-assist device 10-1 does not send out any data; the wearable motion-assist device 10-1 only receives data from the wearable motion-assist device 10-2.

When the wearable motion-assist device 10-1 of the doctor 1 does not send out any data including the respective detection signals, the wearable motion-assist device 10-1 and the wearable motion-assist device 10-2 will have a master-slave relationship. That is, when the patient 2 moves the wearable motion-assist device 10-2, the motions are directly applied to the wearable motion-assist device 10-1.

Figure 10:
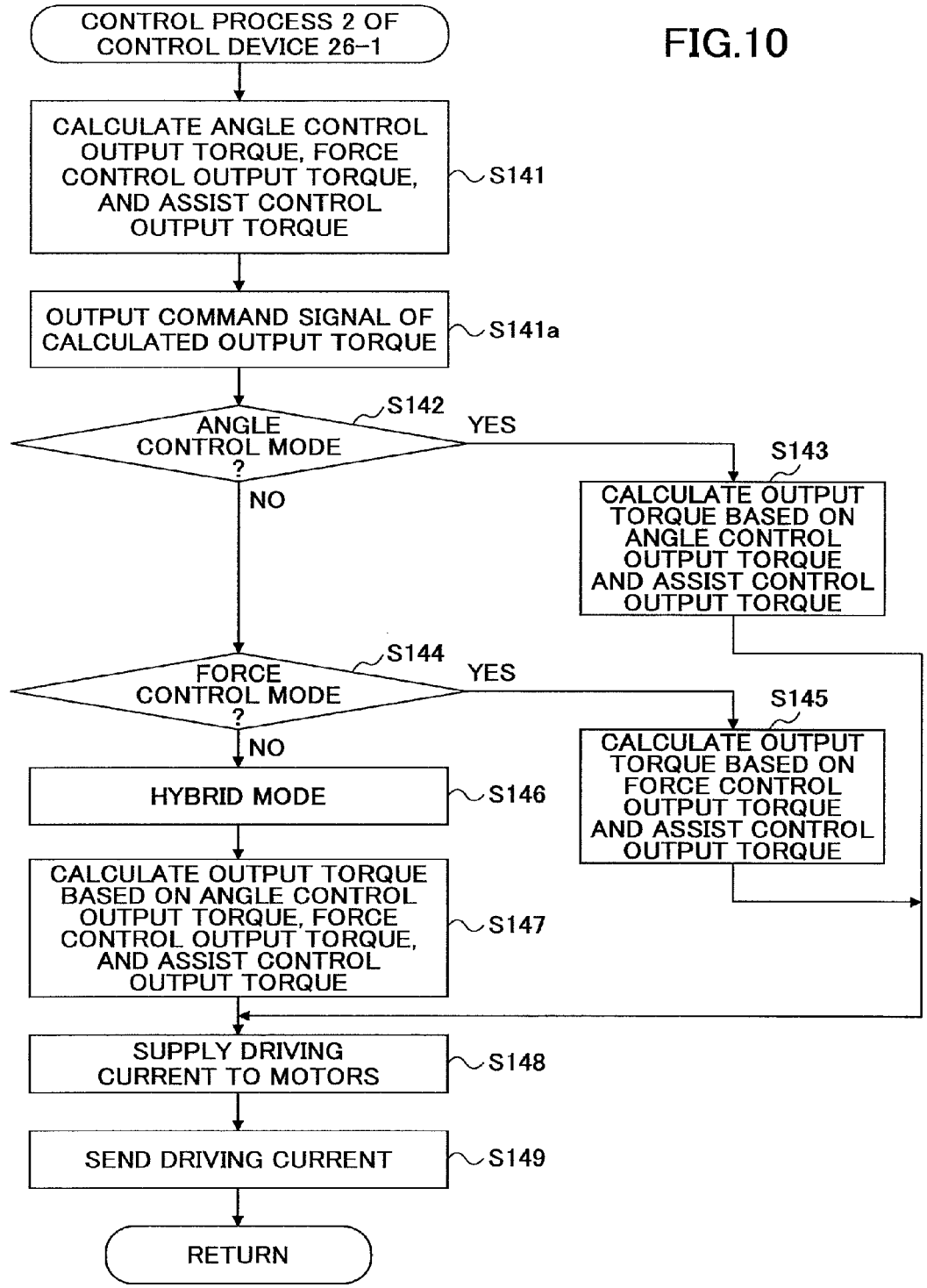
FIG. 10 is a flowchart for describing a control process 2 performed by the control device 26-1 of the wearable motion-assist device of the doctor, according to a second embodiment of the present invention.
Figure 11:
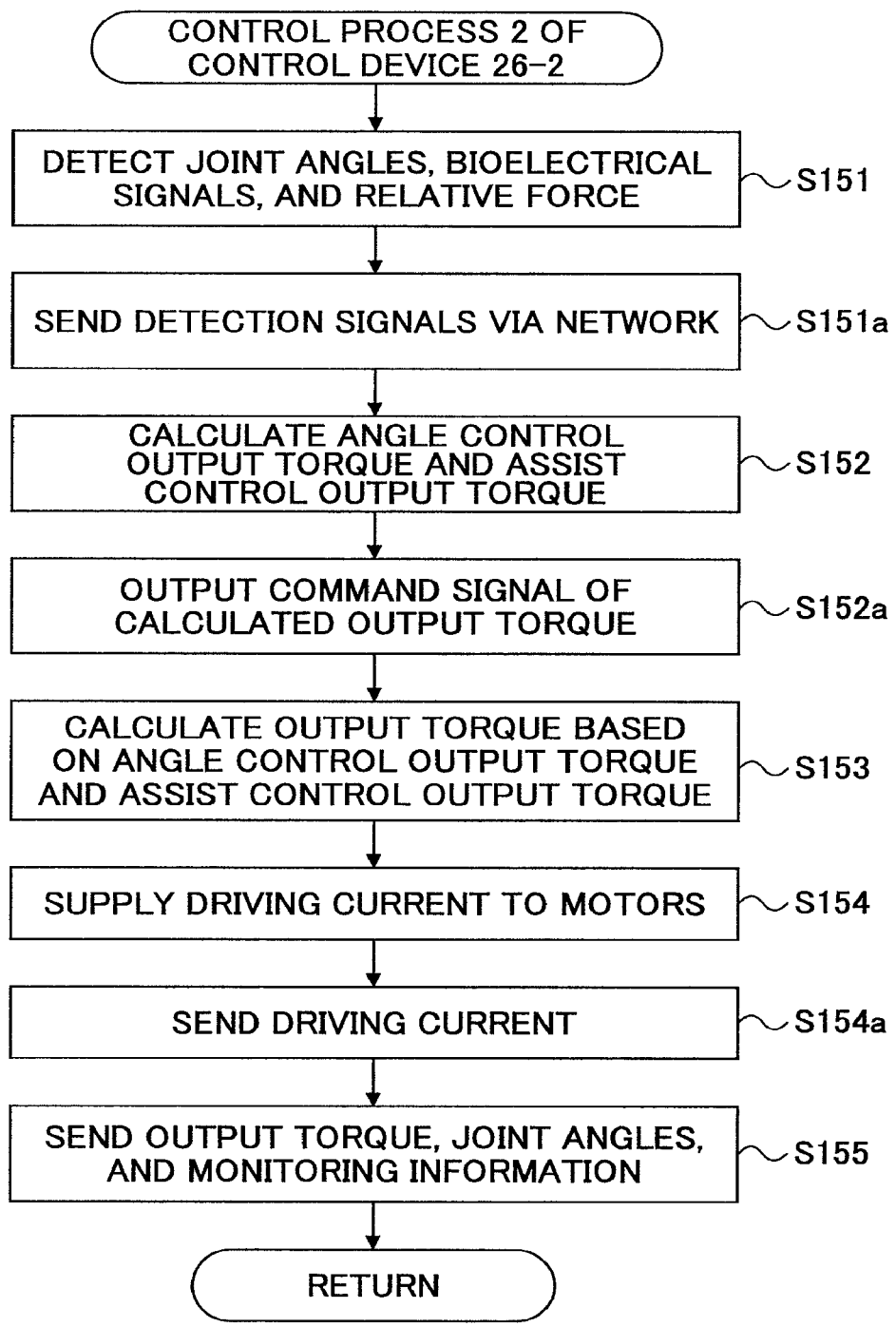
FIG. 11 is a flowchart for describing a control process 2 performed by the control device 26-2 of the wearable motion-assist device of the patient, according to the second embodiment of the present invention.

FIG. 10 is a flowchart for describing a control process 2 performed by the control device 26-1 of the wearable motion-assist device 10-1 of the doctor 1. FIG. 11 is a flowchart for describing a control process 2 performed by the control device 26-2 of the wearable motion-assist device 10-2 of the patient 2.

First, a description is given of operations of the wearable motion-assist device 10-1 of the doctor 1.

The angle controlling unit 42 of the control device 26-1 calculates angle control output torque for implementing control so that the joint angles and the joint angular speed of the wearable motion-assist device 10-1 of the doctor 1 correspond to the joint angles and the joint angular speed sent from the wearable motion-assist device 10-2 of the patient 2. Furthermore, the force controlling unit 43 of the control device 26-1 calculates force control output torque for implementing control so that the output torque of the actuator unit 25-1 of the wearable motion-assist device 10-1 corresponds to or becomes proportional to the output torque of the actuator unit 25-2 sent from the wearable motion-assist device 10-2 of the patient 2. The assist controlling unit 44 calculates the assist control output torque based on the output torque, the joint angles, the bioelectrical potential, and the relative force of the wearable motion-assist device 10-1 (step S141). Subsequently, the output torque adding unit 46 outputs, to the driver 27-1, torque command signals of the angle control output torque, the force control output torque, and the assist control output torque calculated at step S141 (step S141a). When the doctor 1 is not wearing the wearable motion-assist device 10-1, the assist control output torque is calculated assuming that bioelectrical signal=0.

The output torque adding unit 46 of the control device 26-1 determines whether the mode set at the mode setting unit 45 of the control device 26-1 is the angle control mode (step S142). In step S142, when the output torque adding unit 46 determines that the angle control mode is set (YES), the output torque adding unit 46 calculates the output torque by formula (3) based on the angle control output torque and the assist control output torque (step S143).

In step S142, when the output torque adding unit 46 determines that the angle control mode is not set (NO), next, the output torque adding unit 46 determines whether the force control mode is set (step S144). In step S144, when the output torque adding unit 46 determines that the force control mode is set (YES), the output torque adding unit 46 calculates the output torque by formula (4) based on the force control output torque and the assist control output torque (step S145).

In step S144, when the output torque adding unit 46 determines that the force control mode is not set (NO), the output torque adding unit 46 determines that the hybrid mode is set at the mode setting unit 45, which is neither the angle control mode nor the force control mode (step S146). Next, the output torque adding unit 46 calculates the output torque by formula (5) based on the angle control output torque, the force control output torque, and the assist control output torque (step S147).

Subsequently, the output torque adding unit 46 outputs the torque command signals of the output torque calculated at any one of steps S143, S145, and S147, to the driver 27-1 via the torque output unit 47. Then, the driver 27-1 supplies control signals (driving currents at the motors) corresponding to the output torque, to the motors 120, 122, 124, and 126 of the actuator unit 25-1 (step S148). Next, the control signals (driving currents at the motors) corresponding to the output torque are sent to the other wearable motion-assist device 10-2 via the communications device 28-1 (28-2) and the network 3 (step S149).

Accordingly, the motions of the patient 2 are applied to the wearable motion-assist device 10-1 of the doctor 1.

Next, a description is given of operations of the wearable motion-assist device 10-2 of the patient 2, with reference to the flowchart shown in FIG. 11.

The angle detecting unit 24-2 of the wearable motion-assist device 10-2 detects the joint angles of the suit mechanism unit 20-2. Furthermore, the bioelectrical signal detecting unit 23-2 detects bioelectrical signals (for example, myoelectric potential signals and neurotransmission signals) that are generated when the patient 2 moves muscles around his/her joints. Furthermore, the relative force detecting unit 22-2 detects the relative force that is determined by the relationship between the output torque of the actuator unit 25-2 which is the driving source and the muscle force of the patient who is the wearer. Next, these detection signals are read (step S151). Subsequently, the respective detection signals indicating the joint angles, the bioelectrical signals, the relative force, and the body temperature calculated at step S151, are sent to the other wearable motion-assist device 10-1 via the communications device 28-1 (28-2) and the network 3 (step S151a).

The angle controlling unit 42 of the control device 26-2 calculates angle control output torque corresponding to the joint angles and the joint angular speed of the wearable motion-assist device 10-2 of the patient 2. In the present embodiment, no data pertaining to the joint angles is sent from the wearable motion-assist device 10-1, and therefore the angle control output torque is calculated by the following formula:

$$\text{angle control output torque} = Gp'^*[\text{self-side joint angle}] + Gd'^*[\text{self-side joint angular speed}] \quad (1')$$

Gp' and Gd' are control parameters supplied from the data storing unit 41. Control parameters may be predetermined values or functional values. The angular speed is calculated from angle information.

The assist controlling unit 44 calculates the assist control output torque based on the output torque, the joint angles, the bioelectrical potential, and the relative force of the wearable motion-assist device 10-2 (step S152). Subsequently, the output torque adding unit 46 outputs, to the driver 27-2, torque command signals of the angle control output torque, the force control output torque, and the assist control output torque calculated at step S152 (step S152a).

In the present embodiment, the force controlling unit 43 of the control device 26-2 does not receive data pertaining to the output torque from the wearable motion-assist device 10-1, and therefore it is assumed that force control output torque=0. For this reason, regardless of the control mode, the output torque adding unit 46 calculates the output torque by formula (3) based on the angle control output torque and the assist control output torque (step S153).

The output torque adding unit 46 outputs the calculated output torque to the driver 27-2 via the torque output unit 47. Then, the driver 27-2 supplies power (driving currents at the motors) corresponding to the output torque, to the motors 120, 122, 124, and 126 of the actuator unit 25-2 (step S154). Next, the control signals (driving currents at the motors) corresponding to the output torque are sent to the wearable motion-assist device 10-1 via the communications device 28-1 (28-2) and the network 3 (step S154a).

The data sending unit 48 sends the output torque calculated at step S153 and the joint angles and monitoring information of the suit mechanism unit 20-2 detected at the angle detecting unit 24-2, to the wearable motion-assist device 10-1 and the information display device 31 of the doctor 1 via the communications device 28-1 (28-2) and the network 3 (step S155). Subsequently, the process returns to step S151.

Therefore, the doctor 1 can indirectly recognize the state of the patient 2 by observing the state of the wearable motion-assist device 10-1, and can thus give appropriate rehabilitation instructions to the patient 2. Furthermore, the doctor 1 can refer to the monitoring information displayed on the information display device 31, so that the rehabilitation can be conducted in an increasingly effective manner.

Third Embodiment

Next, a description is given of a motion-assist system according to a third embodiment of the present invention.

In the second embodiment, the wearable motion-assist device 10-1 of the doctor 1 does not send out data, but the wearable motion-assist device 10-2 of the patient 2 sends data to the wearable motion-assist device 10-1 of the doctor 1.

In the present embodiment, the wearable motion-assist device 10-2 of the patient 2 does not send out data (excluding monitoring data), but the wearable motion-assist device 10-1 of the doctor 1 sends data to the wearable motion-assist device 10-2 of the patient 2.

Figure 12:
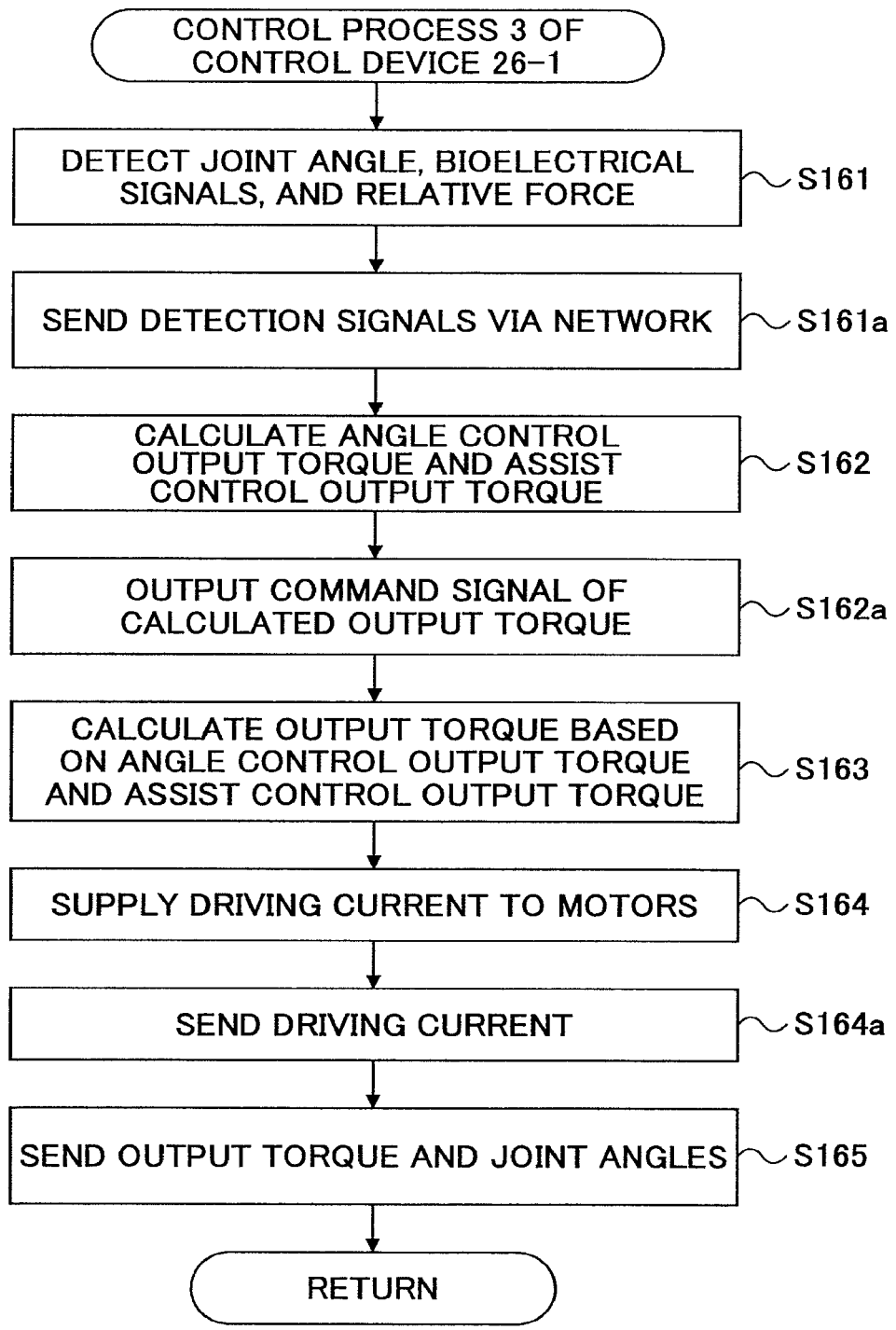
FIG. 12 is a flowchart for describing a control process 3 performed by the control device 26-1 of the wearable motion-assist device of the doctor, according to a third embodiment of the present invention.
Figure 13:
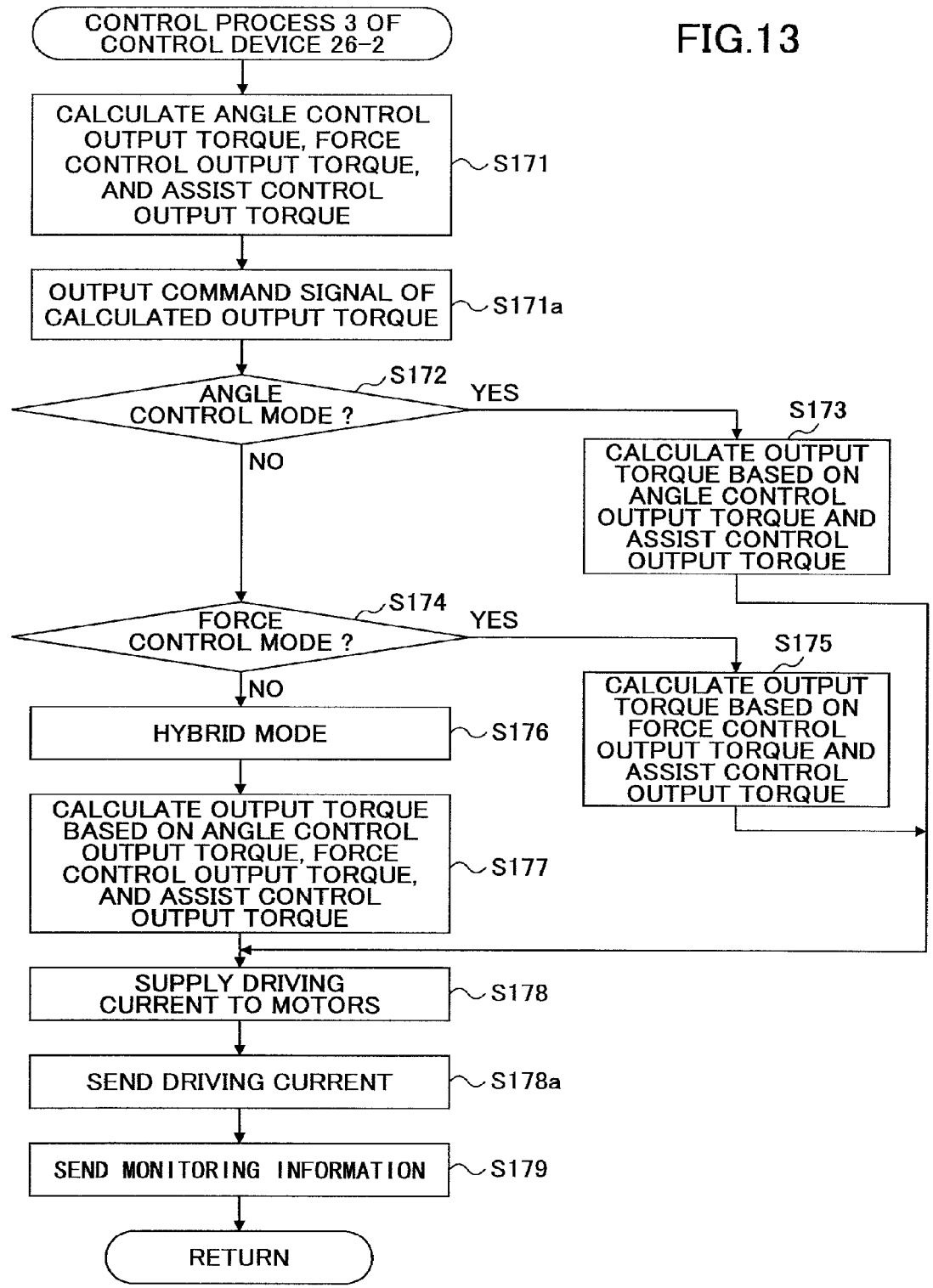
FIG. 13 is a flowchart for describing a control process 3 performed by the control device 26-2 of the wearable motion-assist device of the patient, according to the third embodiment of the present invention.

FIG. 12 is a flowchart for describing a control process 3 performed by the control device 26-1 of the wearable motion-assist device on the doctor. FIG. 13 is a flowchart for describing a control process 3 performed by the control device 26-2 of the wearable motion-assist device on the patient.

First, a description is given of operations of the wearable motion-assist device 10-1 of the doctor 1.

The angle detecting unit 24-1 of the wearable motion-assist device 10-1 detects the joint angle of the suit mechanism unit 20-1. The bioelectrical signal detecting unit 23-1 detects bioelectrical signals (for example, myoelectric potential signals and neurotransmission signals) that are generated when the doctor 1 moves muscles around his/her joints. Then, the relative force detecting unit 22-1 detects the relative force that is determined by the relationship between the output torque of the actuator unit 25-1 which is the driving source and the muscle force of the doctor 1 who is the wearer. Then, the body temperature of the doctor 1 (body temperature at thighs and shins) is detected with the temperature sensors 301 through 304 of the body temperature measuring unit 29-1. Then, these detection signals are read (step S161). Next, the respective detection signals indicating the joint angles, the bioelectrical signals, the relative force, and the body temperature detected at step S161, are sent to the wearable motion-assist device 10-2 via the communications device 28-1 (28-2) and the network 3 (step S161a).

The angle controlling unit 42 of the control device 26-1 calculates angle control output torque corresponding to the joint angles and the joint angular speed of the wearable motion-assist device 10-1 of the doctor 1. In the present embodiment, data regarding joint angles is not sent from the wearable motion-assist device 10-2, and therefore the angle control output torque is calculated by the above formula (1').

The assist controlling unit 44 calculates assist control output torque based on the output torque, the joint angles, the bioelectrical potential, and the relative force of the wearable motion-assist device 10-1 (step S162). Next, the output torque adding unit 46 outputs, to the driver 27-1, torque command signals of the angle control output torque, the force control output torque, and the assist control output torque calculated at step S162 (step S162a).

In the present embodiment, the force controlling unit 43 of the control device 26-1 does not receive data pertaining to the output torque from the wearable motion-assist device 10-2, and therefore it is assumed that force control output torque=0. For this reason, regardless of the control mode, the output torque adding unit 46 calculates the output torque by formula (3) based on the angle control output torque and the assist control output torque (step S163).

The output torque adding unit 46 outputs the calculated output torque to the driver 27-1 via the torque output unit 47. Then, the driver 27-1 supplies power (driving currents at the motors) corresponding to the output torque, to the motors 120, 122, 124, and 126 of the actuator unit 25-1 (step S164). Next, the control signals (driving currents at the motors) corresponding to the output torque are sent to the wearable motion-assist device 10-2 via the communications device 28-1 (28-2) and the network 3 (step S164a).

The data sending unit 48 sends the output torque calculated at step S163 and the joint angles of the suit mechanism unit 20-1 detected at the angle detecting unit 24-1, to the wearable motion-assist device 10-2 of the patient 2 via the communications device 28-1 (28-2) and the network 3 (step S165). Subsequently, the process returns to step S161.

Next, a description is given of operations of the wearable motion-assist device 10-2 of the patient 2.

The angle controlling unit 42 of the control device 26-2 calculates angle control output torque for implementing control so that the joint angles and the joint angular speed of the wearable motion-assist device 10-2 of the patient 2 correspond to the joint angles and the joint angular speed sent from the wearable motion-assist device 10-1 of the doctor 1. Furthermore, the force controlling unit 43 of the control device 26-2 calculates force control output torque for implementing control so that the output torque of the actuator unit 25-2 of the wearable motion-assist device 10-2 corresponds to or becomes proportional to the output torque of the actuator unit 25-1 sent from the wearable motion-assist device 10-1 of the doctor 1. Furthermore, the assist controlling unit 44 calculates assist control output torque based on the output torque, the joint angles, the bioelectrical potential, and the relative force of the wearable motion-assist device 10-2 (step S171). Next, the output torque adding unit 46 outputs, to the driver 27-2, torque command signals of the angle control output torque, the force control output torque, and the assist control output torque calculated at step S171 (step S171a). When the doctor 1 is not wearing the wearable motion-assist device 10-1, the assist control output torque is calculated assuming that bioelectrical signals=0.

The output torque adding unit 46 of the control device 26-2 determines whether the mode set at the mode setting unit 45 of the control device 26-2 is the angle control mode (step S172). In step S172, when the output torque adding unit 46 determines that the angle control mode is set (YES), the output torque adding unit 46 calculates the output torque by formula (3) based on the angle control output torque and the assist control output torque (step S173).

In step S172, when the output torque adding unit 46 determines that the angle control mode is not set (NO), next, the output torque adding unit 46 determines whether the force control mode is set (step S174). In step S174, when the output torque adding unit 46 determines that the force control mode is set (YES), the output torque adding unit 46 calculates the output torque by formula (4) based on the force control output torque and the assist control output torque (step S175).

In step S174, when the output torque adding unit 46 determines that the force control mode is not set (NO), the output torque adding unit 46 determines that the hybrid mode is set at the mode setting unit 45, which is neither the angle control mode nor the force control mode (step S176). Next, the output torque adding unit 46 calculates the output torque by formula (5) based on the angle control output torque, the force control output torque, and the assist control output torque (step S177).

Subsequently, the output torque adding unit 46 outputs the torque command signals of the output torque calculated at any one of steps S173, S175, and S177, to the driver 27-2 via the torque output unit 47. Then, the driver 27-2 supplies control signals (driving currents at the motors) corresponding to the output torque, to the motors 120, 122, 124, and 126 of the actuator unit 25-2 (step S178). Next, the control signals (driving currents at the motors) corresponding to the output torque are sent to the wearable motion-assist device 10-1 via the communications device 28-1 (28-2) and the network 3 (step S178a). Accordingly, the motions of the doctor 1 are applied to the wearable motion-assist device 10-2 of the patient 2.

Subsequently, monitoring information is sent out via the data sending unit 48 of the control device 26-2 (step S179). Subsequently, the process returns to step S171. The monitoring information that has been sent out undergoes a visualization process and is displayed on the information display device 31 which is provided separately from the wearable motion-assist device 10-1 of the doctor 1.

Thus, according to the present embodiment, although the motions of the patient 2 are not applied to the wearable motion-assist device 10-1 of the doctor 1, the wearable motion-assist device 10-1 of the doctor 1 can be used to give instructions for rehabilitation motions to the wearable motion-assist device 10-2 of the patient 2. Furthermore, the doctor 1 can recognize monitoring information of the patient 2 such as the heart rate and body temperature, while giving rehabilitation instructions.

Fourth Embodiment

In the wearable motion-assist device 10-1 (10-2), the main control process is the regular assist control process (refer to the flowchart of FIG. 7), for generating assistance power based on the intentions of the wearer 112. In the present embodiment, when rehabilitation is performed, the control process is executed in one of the angle control mode, the force control mode, or the hybrid control mode, which is set by the mode setting unit 45. Furthermore, it is possible to automatically switch to an assist control process based on biological signals (for example, myoelectric potential signals, neurotransmission signals, and brain wave detection signals), so that excessive power (motor torque) is not applied to the frame mechanism 118, in accordance with the physical condition of the wearer 112.

Figure 14:
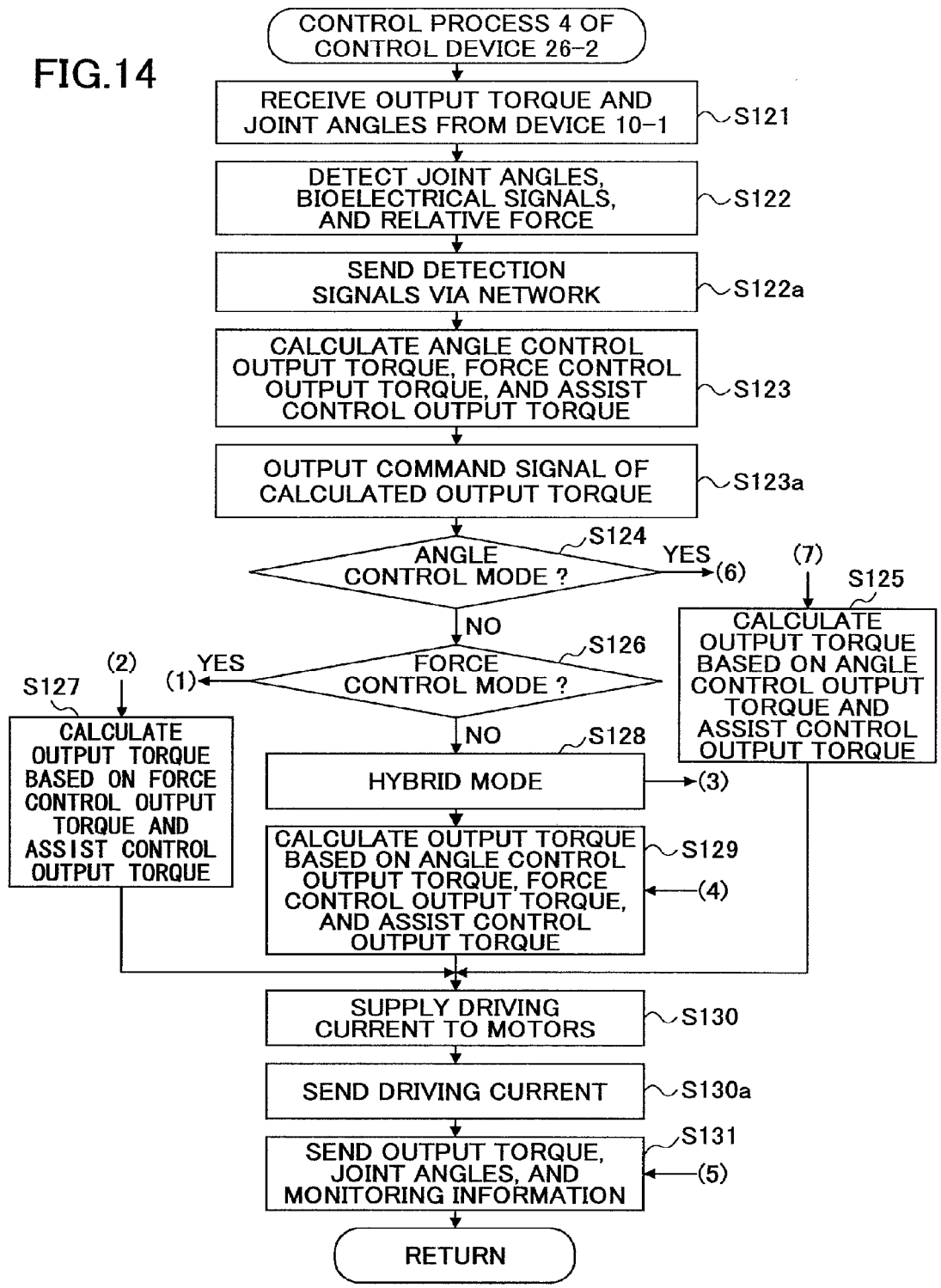
FIG. 14 is a flowchart for describing a control process 4 performed by the control device 26-2, according to a fourth embodiment of the present invention.
Figure 15:
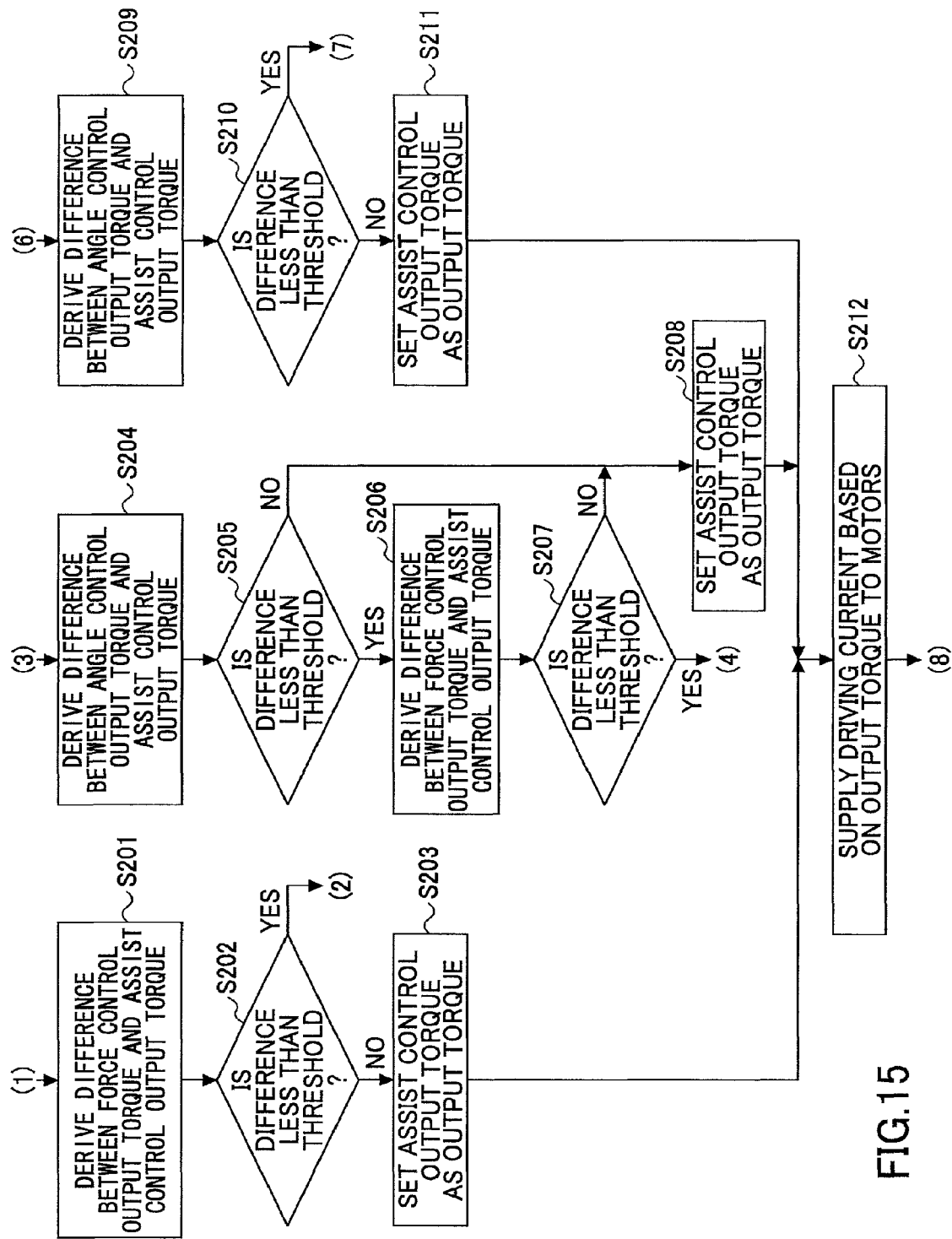
FIG. 15 is a flowchart for describing the control process 4 performed by the control device 26-2, after the control process shown in FIG. 14.
Figure 16:
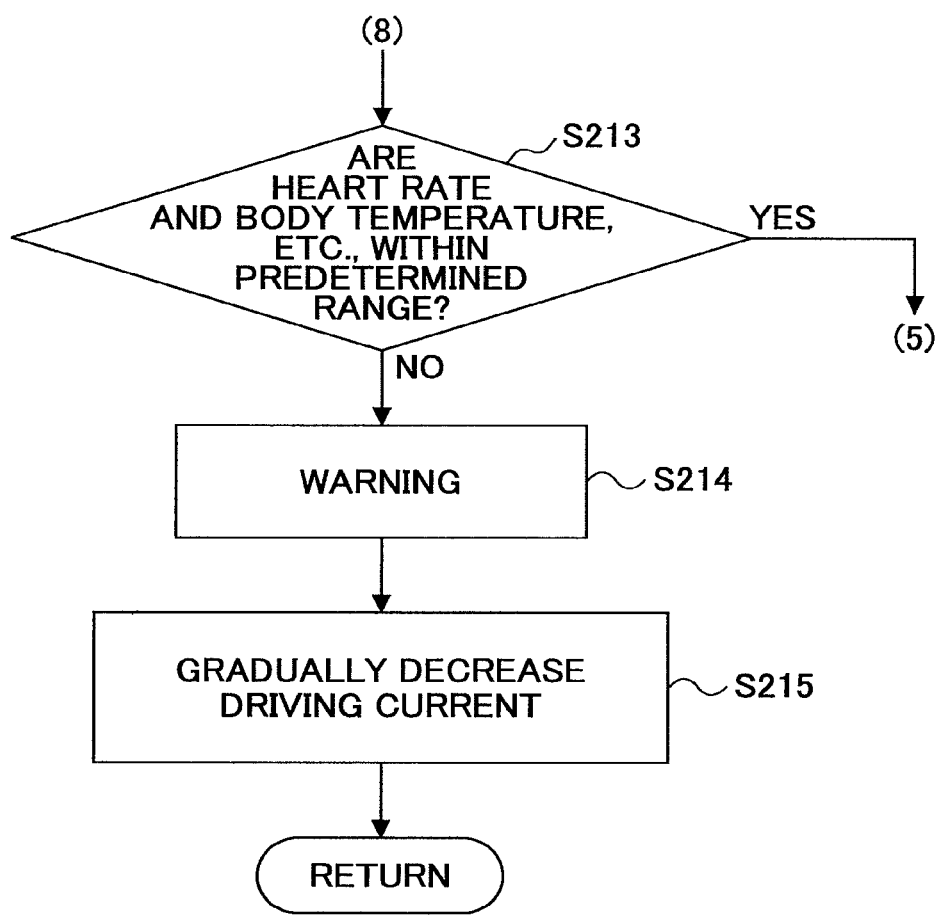
FIG. 16 is a flowchart for describing the control process 4 performed by the control device 26-2, after the control process shown in FIG. 15.

FIGS. 14 through 16 are flowcharts for describing a control process 4 performed by the control device 26-2 according to the fourth embodiment. In FIG. 14, process steps corresponding to those in FIG. 9 are denoted by the same step numbers, and are not further described.

In step S126 of FIG. 14, when the force control mode is set (YES), the process proceeds to step S201 of FIG. 15, where the control device 26-2 derives the difference between the force control output torque and the assist control output torque. Next, in step S202, the control device 26-2 confirms whether the difference between the force control output torque and the assist control output torque is less than a threshold set in advance. In step S202, when the difference between the force control output torque and the assist control output torque is less than the threshold (YES), the process proceeds to step S127, where the control device 26-2 calculates the output torque by formula (4) based on the force control output torque and the assist control output torque, as described above.

In step S202, when the difference between the force control output torque and the assist control output torque exceeds the threshold (NO), the process proceeds to step S203, where the assist control output torque is set as the output torque. Accordingly, when the difference between the force control output torque and the output torque of assist control exceeds the threshold, whereby the assist control output torque is based on biological signals (for example, biological information including myoelectric potential signals, neurotransmission signals, and brain wave detection signals) generated according to the intention of the wearer 112, the angle control output torque is eliminated and only the assist control output torque is used as the assistance power that is transmitted to the frame mechanism 118. Therefore, excessive force is prevented from being applied to the wearer 112. Accordingly, when the wearer 112 is in a bad physical condition, the assistance force is decreased so as to mitigate the load on the wearer 112 during rehabilitation.

In step S128 of FIG. 14, when the hybrid mode is set, the process proceeds to step S204 of FIG. 15, where the control device 26-2 derives the difference between the angle control output torque and the assist control output torque. Next, in step S205, the control device 26-2 confirms whether the difference between the angle control output torque and the assist control output torque is less than a threshold set in advance. In step S205, when the difference between the angle control output torque and the assist control output torque is less than the threshold (YES), the process proceeds to step S206, where the control device 26-2 derives the difference between the force control output torque and the assist control output torque.

In step S205, when the difference between the angle control output torque and the assist control output torque exceeds the threshold (NO), the process proceeds to step S208, where the assist control output torque is set as the output torque. Accordingly, when the difference between the angle control output torque for the rotational angles of joints of the wearer 112 and the output torque of assist control is too large, whereby the assist control output torque is based on biological signals (for example, biological information including myoelectric potential signals, neurotransmission signals, and brain wave detection signals) generated according to the intention of the wearer 112, the angle control output torque is eliminated, and only the assist control output torque is used as the assistance power that is transmitted to the frame mechanism 118. Therefore, excessive force is prevented from being applied to the wearer 112. Accordingly, when the wearer 112 is in a bad physical condition, the assistance force is decreased so as to mitigate the load on the wearer 112 during rehabilitation.

Next, in step S207, the control device 26-2 confirms whether the difference between the force control output torque and the assist control output torque is less than a threshold. In step S207, when the difference between the force control output torque and the assist control output torque is less than the threshold (YES), the process proceeds to step S129 of FIG. 14, where the control device 26-2 calculates the output torque by formula (5) based on the angle control output torque, the force control output torque, and the assist control output torque.

In step S207, when the difference between the force control output torque and the assist control output torque exceeds the threshold (NO), the process proceeds to step S208, where the assist control torque is set as the output torque. Accordingly, when the difference between the force control output torque and the output torque of assist control is too large, whereby the assist control output torque is based on biological signals (for example, biological information including myoelectric potential signals, neurotransmission signals, and brain wave detection signals) generated according to the intention of the wearer 112, the force control output torque is eliminated and only the assist control output torque is used as the assistance power that is transmitted to the frame mechanism 118. Therefore, excessive force is prevented from being applied to the wearer 112. Accordingly, when the wearer 112 is in a bad physical condition, the assistance force is decreased so as to mitigate the load on the wearer 112 during rehabilitation.

In step S124 of FIG. 14, when the angle control mode is set (YES), the process proceeds to step S209 of FIG. 15, where the control device 26-2 derives the difference between the angle control output torque and the assist control output torque. Next, in step S210, the control device 26-2 confirms whether the difference between the angle control output torque and the assist control output torque is less than a threshold set in advance. In step S210, when the difference between the angle control torque and the assist control output torque is less than the threshold set in advance (YES), the process proceeds to step S125 of FIG. 14, where the control device 26-2 calculates the output torque by formula (3) based on the angle control output torque and the assist control output torque.

In step S210, when the difference between the angle control output torque and the assist control output torque exceeds the threshold set in advance (NO), the process proceeds to step S211, where the assist control torque is set as the output torque. Accordingly, when the difference between the angle control output torque for the rotational angles of joints of the wearer 112 and the output torque of assist control exceeds the threshold, whereby the assist control output torque is based on biological signals (for example, biological information including myoelectric potential signals, neurotransmission signals, and brain wave detection signals) generated according to the intention of the wearer 112, the angle control output torque is eliminated and only the assist control output torque is used as the assistance power that is transmitted to the frame mechanism 118. Therefore, excessive force is prevented from being applied to the wearer 112. Accordingly, when the wearer 112 is in a bad physical condition, the assistance force is decreased so as to mitigate the load on the wearer 112 during rehabilitation.

After each of steps S203, S208, and S211, the process proceeds to step S212, where the driving currents based on the output torque are supplied to the motors 120, 122, 124, and 126 of the actuator unit 25-2.

Furthermore, in step S213 of FIG. 16, the control device 26-2 confirms whether the detected values of the heart rate and body temperature, etc., are within a predetermined range. In step S213, when the detected values of the heart rate and body temperature, etc., are within the predetermined range (YES), the process proceeds to step S131 of FIG. 14, where the output torque calculated at any one of steps S125, S127, and S129 and the joint angles of the suit mechanism unit 20-2 detected by the angle detecting unit 24-2 are sent from the data sending unit 48 to the wearable motion-assist device 10-1 of the doctor 1 via the communications device 28-1 (28-2) and the network 3, and monitoring information is sent to the information display device 31 of the doctor 1. Subsequently, the process returns to step S121.

In step S213, when the detected values of the heart rate and body temperature, etc., are not within the predetermined range (NO), the process proceeds to step S214, where a warning (alarm) is generated because an excessive motion (load) is applied to the wearer 112. In step S215, the value of the driving current is gradually decreased, and the load on the wearer 112 is mitigated, so that the motion amount of the wearer 112 is decreased to a reasonable level. Accordingly, when the wearer 112 is in a bad physical condition, the motions of the joints are reduced so that relatively low-impact motions can be achieved, thereby making it possible to safely perform the rehabilitation in accordance with the physical condition.

According to the present invention, a control unit of another one of the wearable motion-assist devices controls a driving unit based on data transferred by a data transfer unit, such that a motion of the other one of the wearable motion-assist devices corresponds to a motion of one of the wearable motion-assist devices. For example, a doctor or a physical therapist can use the wearable motion-assist device to objectively recognize the state of the target of motion assistance such as a patient or a trainee. Accordingly, motion assistance such as rehabilitation and training can be effectively performed, and the target of motion assistance such as a patient or a trainee can directly receive instructions of motion assistance from a doctor or a physical therapist. Furthermore, even when the doctor and the patient are at remote locations from one another, instructions for motion assistance can be transmitted and received via a communications unit, and the doctor can sense the motion of the target of motion assistance in response to the instructions.

The present invention is not limited to the specifically disclosed embodiment, and variations may be made without departing from the scope of the present invention. Furthermore, various inventions may be achieved by appropriately combining plural elements disclosed in the above embodiments. For example, some of the elements may be eliminated from each embodiment. Furthermore, elements of different embodiments may be appropriately combined.

The present application is based on Japanese Priority Patent Application No. 2007-213359, filed on Aug. 20, 2007, and Japanese Priority Patent Application No. 2008-208027, filed on Aug. 12, 2008, the entire contents of which are hereby incorporated by reference.

The invention claimed is:

1. A motion-assist system comprising:
a plurality of wearable motion-assist devices, wherein a wearable motion-assist device comprises:
a biological signal detecting unit configured to detect a biological signal generated in accordance with a motion of a wearer of a motion-assist tool included in the wearable motion-assist device;
a physical phenomenon detecting unit configured to detect a detection signal corresponding to a physical phenomenon in accordance with the motion of the wearer;
a driving unit configured to apply assistance power to the motion-assist tool worn by the wearer, wherein:
the physical phenomenon detecting unit is an angle sensor configured to detect a rotational angle at a joint of the wearer of the motion-assist tool driven by the driving unit; and
a control unit configured to control the driving unit to generate the assistance power, by performing a calculation process based on the detection signal detected by the physical phenomenon detecting unit,
a communications unit configured to connect together a plurality of the control units of the plurality of the wearable motion-assist devices such that communications can be performed therebetween; and
a data transfer unit configured to transfer data corresponding to at least one of the signals acquired in one of the wearable motion-assist devices, to another one of the wearable motion-assist devices via the communications unit, wherein:
the control unit of the other one of the wearable motion-assist devices controls the driving unit based on the data transferred by the data transfer unit, such that a motion of the other one of the wearable motion-assist devices corresponds to a motion of the one of the wearable motion-assist devices, wherein:
the control unit of the other one of the wearable motion-assist devices controls the driving unit based on the rotational angle at the joint of the wearer wearing the one of the wearable motion-assist devices, whereby the rotational angle is detected by the angle sensor,
the control unit of the other one of the wearable motion-assist devices controls the driving unit based on the biological signal detected by the biological signal detecting unit, in the event that a difference between a rotational angle of the joint detected by the angle sensor of the one of the wearable motion-assist devices and a rotational angle of the joint detected by the angle sensor of the other one of the wearable motion-assist devices exceeds a threshold that is set in advance.

2. The motion-assist system according to claim 1, wherein:
the control unit of the one of the wearable motion-assist devices is connected to the control unit of the other one of the wearable motion-assist devices via the communications unit, such that the data can be transmitted and received therebetween.

3. The motion-assist system according to claim 2, wherein:
the control unit of the one of the wearable motion-assist devices controls the driving unit based on the data transferred by the data transfer unit, such that the motion of the one of the wearable motion-assist devices corresponds to the motion of the other one of the wearable motion-assist devices.

4. The motion-assist system according to claim 1, wherein:
the physical phenomenon detecting unit is a torque sensor configured to detect a torque applied to a joint of the wearer by the driving unit.

5. The motion-assist system according to claim 4, wherein:
the control unit of the other one of the wearable motion-assist devices controls the driving unit of the other one of the wearable motion-assist devices based on the torque of the driving device of the one of the wearable motion-assist devices detected by the torque sensor.

6. The motion-assist system according to claim 5, wherein:
the control unit of the other one of the wearable motion-assist devices controls the driving unit based on the biological signal detected by the biological signal detecting unit, in the event that a difference between a torque detected by the torque sensor of the one of the wearable motion-assist devices and another torque detected by the torque sensor of the other one of the wearable motion-assist devices exceeds a threshold that is set in advance.

7. The motion-assist system according to claim 1, wherein:
the control unit of the wearable motion-assist device comprises a specifying unit configured to specify the control unit of an arbitrary one of the plurality of the wearable motion-assist devices, as a master control unit.

8. The motion-assist system according to claim 1, wherein:
the control unit of the one of the wearable motion-assist devices sends the detection signal detected by the physical phenomenon detecting unit to the other one of the wearable motion-assist devices via the communications unit; and
the other one of the wearable motion-assist devices comprises a sensing unit configured to cause the wearer to sense the physical phenomenon corresponding to the detection signal received via the communications unit.

* * * * *